(12) United States Patent
Rao et al.

(10) Patent No.: US 6,775,629 B2
(45) Date of Patent: Aug. 10, 2004

(54) SYSTEM AND METHOD FOR ESTIMATING ONE OR MORE TONES IN AN INPUT SIGNAL

(75) Inventors: Yong Rao, Round Rock, TX (US); Michael Cerna, Austin, TX (US)

(73) Assignee: National Instruments Corporation, Austin, TX (US)

( * ) Notice: Subject to any disclaimer, the term of this patent is extended or adjusted under 35 U.S.C. 154(b) by 364 days.

(21) Appl. No.: 09/880,167

(22) Filed: Jun. 12, 2001

(65) Prior Publication Data

US 2003/0040875 A1 Feb. 27, 2003

(51) Int. Cl.[7] .............................................. G01R 23/16
(52) U.S. Cl. ........................ 702/76; 704/205; 381/101
(58) Field of Search .............................. 702/66, 70–71, 702/73–79, 106, 189; 704/203, 205–207, 229; 700/94; 381/101–102

(56) References Cited

U.S. PATENT DOCUMENTS

| | | | | |
|---|---|---|---|---|
| 3,571,522 A | * | 3/1971 | Cox ............................. | 370/526 |
| 3,937,899 A | * | 2/1976 | Denenberg ................... | 702/74 |
| 4,698,769 A | * | 10/1987 | McPherson et al. ......... | 708/312 |
| 5,563,942 A | * | 10/1996 | Tulai ........................... | 379/351 |
| 5,617,491 A | * | 4/1997 | Roth ........................... | 382/285 |
| 5,910,906 A | * | 6/1999 | Schmitt ....................... | 708/312 |
| 6,122,246 A | * | 9/2000 | Marchok et al. ............ | 370/208 |
| 6,122,657 A | | 9/2000 | Hoffman, Jr. et al. | |
| 6,128,370 A | * | 10/2000 | Barazesh et al. ............. | 379/31 |
| 6,195,675 B1 | | 2/2001 | Wang et al. | |
| 6,199,036 B1 | * | 3/2001 | Ahmadi ....................... | 704/207 |
| 6,229,889 B1 | * | 5/2001 | Cannon et al. ............. | 379/386 |
| 6,263,048 B1 | * | 7/2001 | Nelson et al. ............ | 379/27.03 |
| 6,393,124 B1 | * | 5/2002 | Tsai et al. .................... | 379/386 |
| 6,484,112 B1 | * | 11/2002 | Scheppach ................... | 702/77 |
| 6,486,975 B1 | * | 11/2002 | Verreault et al. ........... | 358/445 |
| 6,577,968 B2 | * | 6/2003 | Nelson ........................ | 702/77 |

\* cited by examiner

*Primary Examiner*—Marc S Hoff
*Assistant Examiner*—Mary Catherine Baran
(74) *Attorney, Agent, or Firm*—Meyertons Hood Kivlin Kowert & Goetzel, P.C.; Jeffrey C. Hood

(57) ABSTRACT

System and method for estimating signal parameters (e.g., frequency, amplitude and/or phase) of one or more tones present in an input signal. Samples of the input signal are received, and a frequency transform of the samples generated. An amplitude peak in the frequency transform corresponding to the tone is identified. Two or more frequency bins are selected proximate to the identified frequency in the transform. A tone frequency value is determined that minimizes a difference between two or more expressions, each including respective numerator and denominator terms corresponding to respective frequency bins and whose ratios each represent a complex amplitude of the tone at a respective bin. Each expressions includes a tone frequency variable that represents a correct tone frequency value of the tone. The correct tone frequency value is determined by computing differences between the expressions for different respective tone frequency variable values, and selecting the value that produces a smallest difference.

44 Claims, 17 Drawing Sheets

SYSTEM AND METHOD FOR ESTIMATING ONE OR MORE TONES IN AN INPUT SIGNAL

FIELD OF THE INVENTION

The invention relates generally to the field of signal analysis, and more particularly, to a system and method for detecting the frequency, amplitude and/or phase of one or more tones comprised within an input signal.

DESCRIPTION OF THE RELATED ART

In many applications, it is necessary or desirable to precisely locate one or more tones comprised in a signal. This need arises in many fields including telecommunications, radar, sonar, networking, measurement, and various other applications. Prior art techniques for detecting tones in a signal generally may not produce accurate results and/or may suffer from slow performance.

The discrete Fourier transform (DFT) is a popular tool for analyzing signals. However, before an input signal is transformed, it is quite often windowed with a windowing function. (It is noted that the action of capturing a finite-length sequence of samples of the input signal automatically implies a rectangular windowing.) The frequency transform F(n) of the windowed input signal will typically exhibit multiple scaled and shifted versions of transform function W, i.e., the transform of the window function. Each sinusoidal component of the input signal expresses itself as a pair of such shifted versions, one version shifted up to the frequency $f_j$ of the sinusoidal component, and the other shifted down to frequency $-f_j$. The positive frequency version is referred to herein as a positive frequency image, and the negative frequency version is referred to herein as a negative frequency image. When a sinusoidal component frequency $f_j$ is small compared to the sample rate, the positive frequency image and the negative frequency image for the sinusoidal component may overlap in frequency space. Similarly, when a sinusoidal component frequency $f_j$ is close to one-half the sample rate, the positive frequency image and the negative frequency image for the sinusoidal component may overlap. Furthermore, when two sinusoidal components have frequencies that are close together, their positive images and negative images may overlap.

Prior art techniques for tone estimation quite often focus on identifying the peaks in the magnitude spectrum $|F(n)|$. The peaks roughly determine the frequency of the corresponding tones. However, because of the cross-interaction of the images from other tones, or the negative frequency image from the same tone, the peak of a positive frequency image may be perturbed away from a purely scaled and frequency-shifted version of the template function W. Thus, parameter estimation techniques which compute parameters for a given tone based only on transform array values (i.e. DFT values) in the vicinity of a corresponding image peak may not produce accurate results. Therefore, there exists a substantial need for a system and method which could estimate tone parameters from the transform array with increased accuracy.

SUMMARY OF THE INVENTION

The present invention comprises various embodiments of a system and a method for estimating signal parameters (e.g., one or more of frequency, amplitude and/or phase) of one or more tones present in an input signal. More particularly, one embodiment of the invention comprises a system and method for estimating parameters for a tone based on a frequency transform F(n) of the input signal. The input signal may be windowed with a window function w(n) and transformed into the frequency domain.

The tone in the input signal may express itself in the frequency domain as an additive combination of two spectra, one centered at the tone frequency and the other at the negative of the tone frequency. These two spectra are referred to herein as the positive frequency image and the negative frequency image respectively. A tone in the input signal may also be affected by spectra (e.g., positive or negative images) from other tones present in the signal.

The method may comprise first receiving samples of the input signal, wherein the input signal includes the tone. A frequency transform of the samples may then be generated, e.g., a Fourier transform of the samples. The method may then identify a frequency location proximate to an amplitude peak in the frequency transform, wherein the amplitude peak corresponds to the tone. Two or more frequency bins may then be selected proximate to the identified frequency location in the frequency transform. The method preferably selects one or more frequency bins located on either side of the frequency location of the amplitude peak. In other words, the method may select one or more bins located on one side of the amplitude peak and one or more bins located on the other side of the amplitude peak.

The method may then determine a tone frequency value that minimizes a difference between two or more expressions, e.g., at least a first expression and a second expression. Stated another way, the method may select a tone frequency value that makes a plurality of expressions most nearly equal.

Each of the plurality of expressions may comprise a sum of one or more numerator terms divided by a sum of one or more denominator terms, wherein:
1) each of the plurality of expressions includes a tone frequency variable;
2) each numerator term and each denominator term corresponds to one of the frequency bins; and
3) a ratio of each numerator term and its corresponding denominator term represent a complex amplitude of the tone at a respective bin.

Thus, for example, the plurality of expressions may comprise a first expression and a second expression having the above characteristics.

In each expression, the tone frequency variable may represent a correct tone frequency value of the tone. The first expression may be approximately equivalent to the second expression when the correct tone frequency value is used for the tone frequency variable in the first and second complex expressions.

The step of determining a tone frequency value may comprise computing a plurality of differences between the first expression and the second expression for different respective tone frequency values of the tone frequency variable, and then selecting the tone frequency value that produces a smallest difference. The method may compute the plurality of differences by performing a Newton-Rhapson root finding method.

The expressions may be real expressions or complex expressions. Where the expressions are complex expressions, the method may involve minimizing a difference between an amplitude of the first complex expression and an amplitude of the second complex expression.

In the preferred embodiment, the first expression and the second expression have the form:

$$\left|\frac{\sum_{k+1}^{k+M}(F(n)W^*(f_n - f_i) - F^*(n)W(f_n + f_i))}{\sum_{k+1}^{k+M}(|W(f_n - f_i)|^2 - |W(f_n + f_i)|^2)}\right| =$$

$$\left|\frac{\sum_{k+1}^{k+M-1}(F(n)W^*(f_n - f_i) - F^*(n)W(f_n + f_i))}{\sum_{k+1}^{k+M-1}(|W(f_n - f_i)|^2 - |W(f_n + f_i)|^2)}\right|$$

wherein:

F(n) is the nth value of the single sided scaled FFT spectrum; and

W represents a window function, wherein the window function is shifted by a value of the tone frequency variable $f_i$.

When the frequency transform of the samples comprises generating a power spectrum of the samples, the first expression and the second expression have the form:

$$\left|\frac{\sum_{k+1}^{k+M}(|F(n)| \times |W(f_n - f_i)|)}{\sum_{k+1}^{k+M}|W(f_n - f_i)|^2}\right| = \left|\frac{\sum_{k+1}^{k+M-1}(|F(n)| \times |W(f_n - f_i)|)}{\sum_{k+1}^{k+M-1}|W(f_n - f_i)|^2}\right|$$

wherein:

F(n) is the nth value of the single sided scaled FFT spectrum; and

W represents a window function, wherein the window function is shifted by a value of the tone frequency variable $f_i$.

The determined tone frequency value may comprise an approximation of the correct frequency of the tone. In other words, the determined tone frequency value represents an approximation of the correct tone frequency value. The method described herein operates to find a more exact approximation of the frequency of the tone than prior art techniques, even in the presence of noise or interference from other tones, or the negative image of the respective tone being found.

After the tone frequency value has been determined, the method may comprise storing the determined tone frequency value in a memory, or outputting the determined tone frequency value, e.g., on a display or to other systems for further analysis or processing.

The method may also then compute one or more of the amplitude and phase of the tone using the determined tone frequency value. For example, once the $f_i$ value is known, the amplitude and phase can be computed as:

$$A_i e^{j\varphi_i} = C = \frac{\sum_{k+1}^{k+M}(F(n)W^*(f_n - f_i) - F^*(n)W(f_n + f_i))}{\sum_{k+1}^{k+M}(|W(f_n - f_i)|^2 - |W(f_n + f_i)|^2)}$$

When the frequency transform of the samples comprises generating a power spectrum of the samples, the amplitude can be computed as:

$$A_i = \left|\frac{\sum_{k+1}^{k+M}(|F(n)| \times |W(f_n - f_i)|)}{\sum_{k+1}^{k+M}|W(f_n - f_i)|^2}\right|$$

Where the input signal comprises a plurality of tones, the method may operate to correctly find signal parameters of any one of the plurality of tones. Where it is desired to locate two or more of, or all of, the tones present in the input signal, the above steps may be iteratively performed for each of the plurality of tones to determine at least one signal parameter for each of the plurality of tones in the input signal. The above method may be performed iteratively wherein, after a respective tone is identified, the respective tone may be subtracted from the input signal, and the above process repeated for another tone, and so on.

Thus the method of the present invention operates to find more correct approximations of signal parameters of tones present in an input signal, and operates more efficiently than prior art techniques.

BRIEF DESCRIPTION OF THE DRAWINGS

A better understanding of the present invention can be obtained when the following detailed description of the preferred embodiment is considered in conjunction with the following drawings, in which.

Figure 1A:
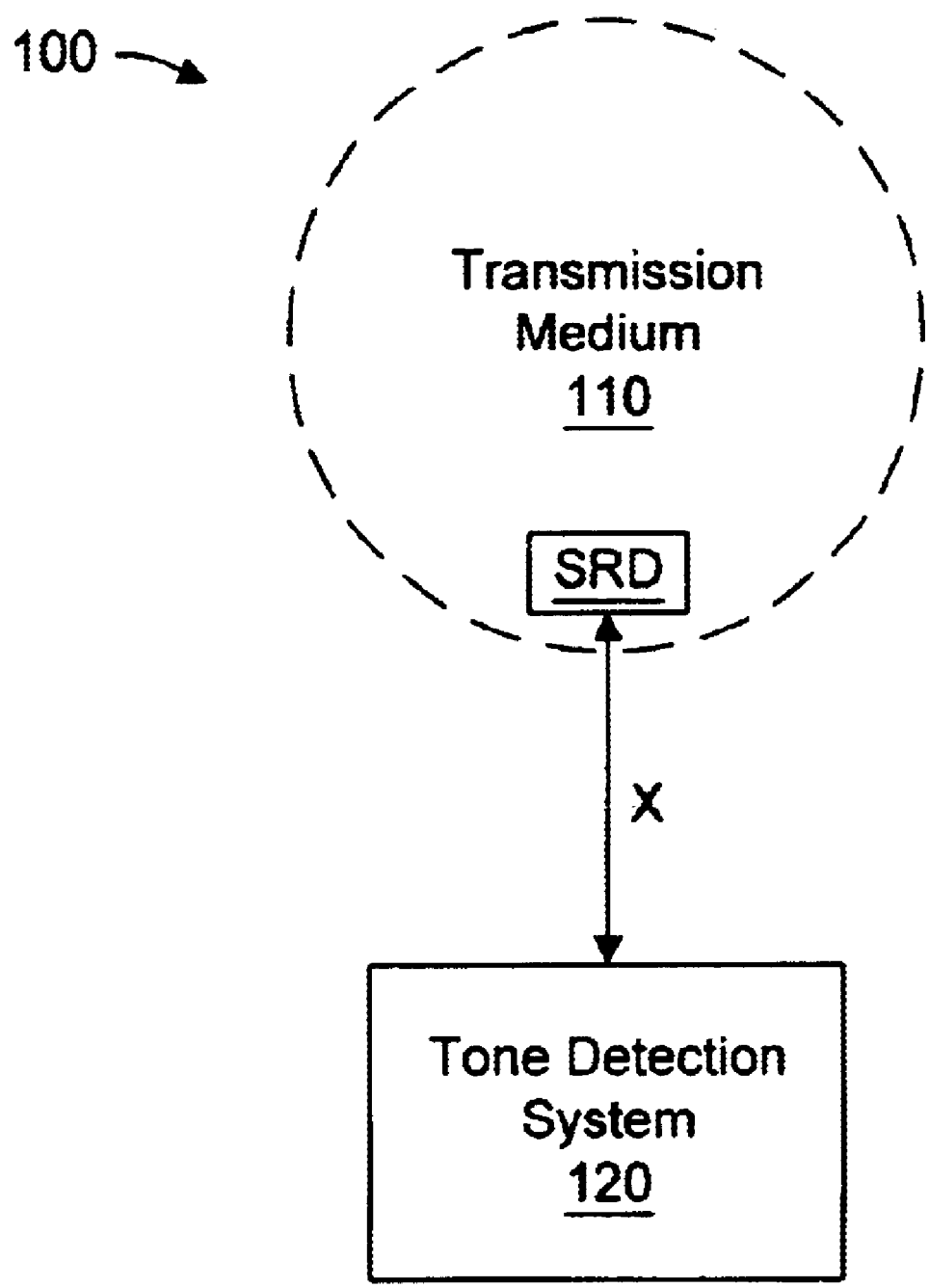
FIG. 1A illustrates a system configuration 100 for determining the signal parameters associated with one or more sinusoidal tones comprised within an input signal.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all

DETAILED DESCRIPTION OF THE EMBODIMENTS

Incorporation by Reference

U.S. patent application Ser. No. 09/753,164 titled "System and Method for Estimating Tones in an Input Signal", Filed Dec. 27, 2000, is hereby incorporated by reference in its entirety as though fully and completely set forth herein.

FIG. 1A

FIG. 1A illustrates a system configuration 100 for performing signal processing on a signal comprising one or more tones. System configuration 100 may comprise a signal reception device SRD and a tone detection system 120.

The SRD may be coupled to receive a signal from a device, unit under test (UUT) or a transmission medium 110, or any other system capable of transmitting a signal that may contain tones. The term "transmission medium" is used herein to refer generally to a device, unit under test (UUT) or a transmission medium 110 that may generate a signal including one or more tones. As used herein, the term "tone" includes a signal at a frequency, e.g., at a primary or single frequency, which may be contained within another signal or may itself be the signal. For example, the signal may simply comprise the tone and a small amount of noise. Alternatively, the signal may comprise the tone and one or more other signals, e.g., one or more other tones. As an example, a tone may comprise a sinusoidal signal having arbitrary amplitude, frequency and phase.

As shown in FIG. 1A, SRD may be coupled to a transmission medium 110. Transmission medium 110 may represent any of a variety of transmission media such as the atmosphere, free space, an optical fiber or fiber bundle, a communication bus (e.g. a network bus), a body of water or any other fluid, the earth, etc. In one embodiment, transmission medium 110 is the atmosphere, and signal reception device SRD comprises an antenna and a radio receiver. In a second embodiment, transmission medium 110 is a network bus connecting two or more computers, and signal reception device SRD is a network interface cardboard. In a third embodiment, transmission medium 110 is an optical fiber, and signal reception device SRD comprises an optical sensor. As noted above, element 110 may be any of various devices or mediums for generating or transmitting a signal.

Signal reception device SRD receives an input signal from the transmission medium or device 110 and may convert the input signal into a form suitable for presentation to tone detection system 120. The input signal may be electrical or non-electrical in nature. Signal reception device SRD may include analog-to-digital conversion hardware to digitize the input signal. Alternatively, analog-to-digital conversion hardware may be comprised within tone detection system 120.

In one embodiment, signal reception device SRD may comprise a measurement device such as a microphone, an accelerometer, a spatial displacement sensor, a strain gauge, a pressure sensor, a temperature sensor (e.g., a thermocouple), a radiation sensor, an optical sensor, etc, or any combination thereof. In another embodiment, signal reception device SRD may represent an array of transducers or measurement devices of one or more types. SRD may thus be any of various transducers or sensors for receiving a signal.

Tone detection system 120 may couple to signal reception device SRD to receive the input signal. In an alternate embodiment, the tone detection system 120 may be operable to receive the input signal from a memory, wherein the input signal was previously acquired and stored in the memory.

Figure 1B:
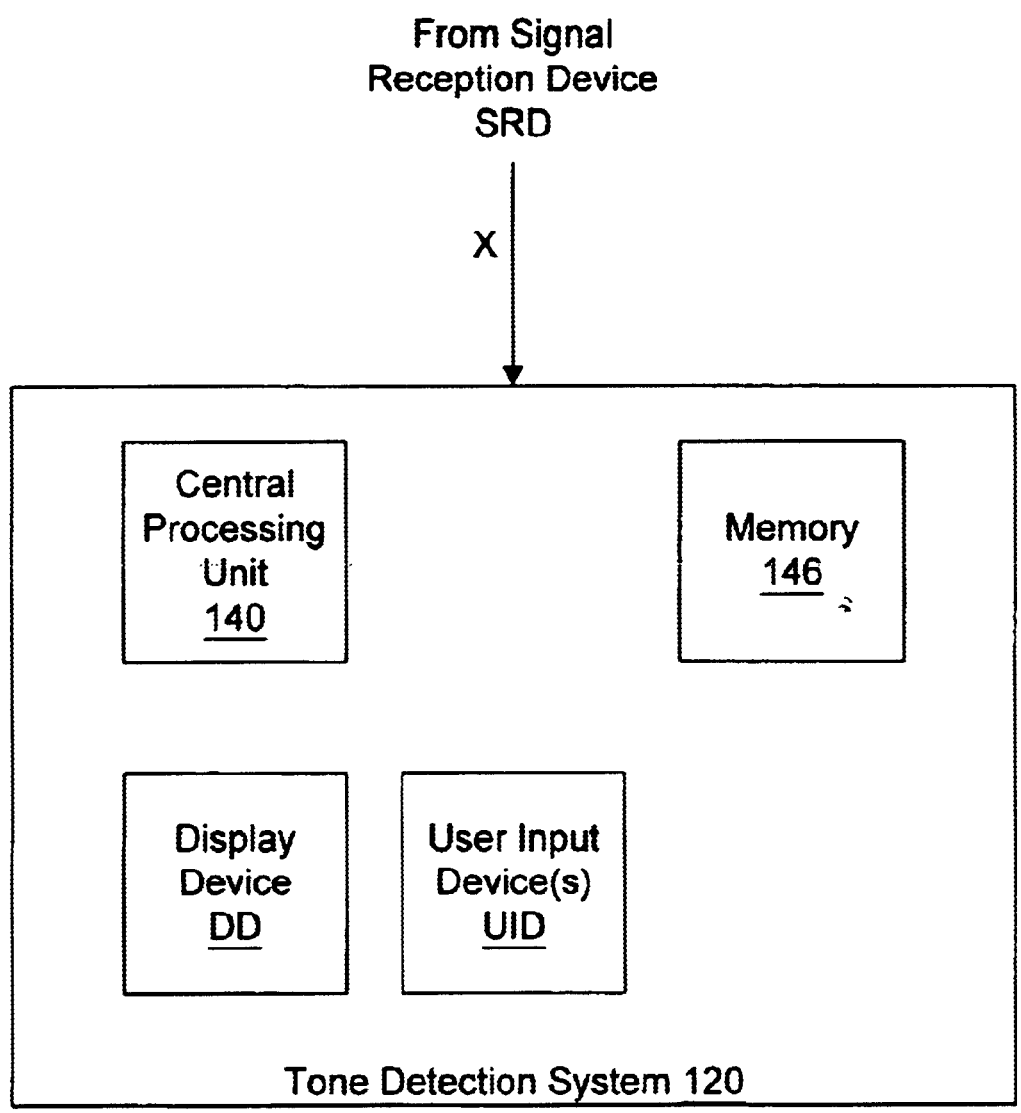
FIG. 1B illustrates one embodiment for tone detection system 120.

Tone detection system 120 may be configured for detecting the frequency, amplitude and/or phase of one or more tones in the input signal. Tone detection system 120 may comprise a processor or central processing unit (CPU) 140, memory 146, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory 146 may comprise any of a variety of memory devices such as random access memory (RAM) and/or read-only memory (ROM), as described further below. Tone detection system 120 may also include specialized data acquisition and/or signal conditioning hardware, interface hardware, etc., or any combination thereof.

Tone detection system 120 may comprise any of various devices, such as a programmable computer system, a computer-based system such as a VXI-based system, a PXI-based system, a GPIB-based system, a computer-based data acquisition system, or a dedicated test instrument, such as a dynamic signal analyzer, an oscilloscope or any other signal acquisition and/or analysis device.

Tone detection system 120 may operate on samples of the input signal X generated by signal reception device SRD and thus may identify the frequency, phase and/or amplitude of one or more tones in the input signal. The frequency, phase and/or amplitude of the one or more tones may be presented to a user through the display device DD or some other output device, may be further processed by a software program executing in the tone detection system 120, may be provided to another system for processing, and/or may be stored to memory for future use.

User input device(s) UID may comprise a keyboard, a pointing device such as a mouse or trackball, a touch pad (such as those used in modern laptop computers for cursor control), a touch sensitive display screen, etc., or other input devices. In one embodiment, user input device(s) UID may include use of a graphical user interface or panel configured with various control icons such as buttons, knobs, sliders, switches, indicators, etc., or any combination thereof. A user provides input to tone detection system 120 through user input device(s). Tone detection system 120 may manage a graphical user interface through display device DD and user input device(s) UID.

Figure 2A:
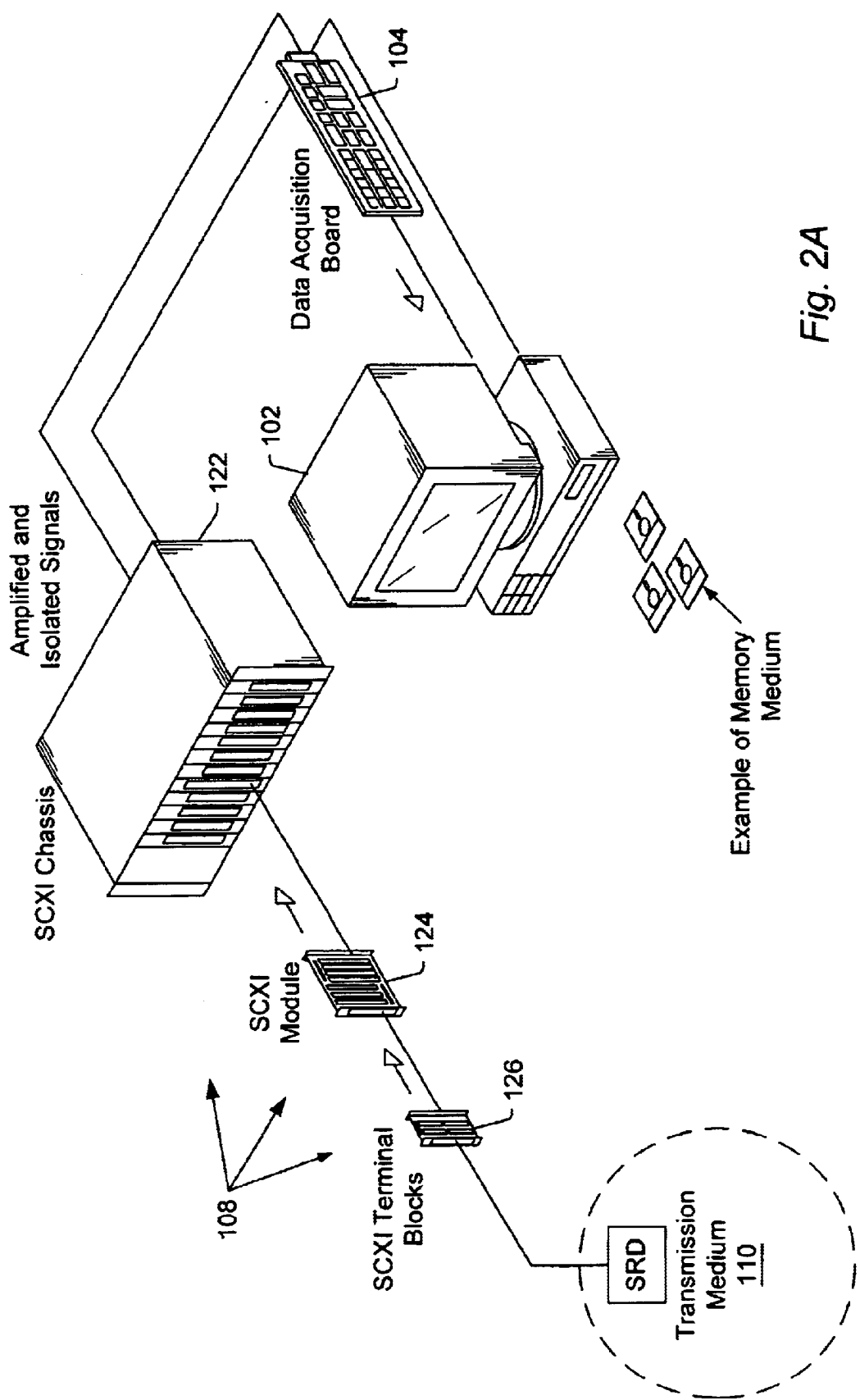
FIG. 2A illustrates one embodiment of tone detection system 120 comprising a computer-based measurement or data acquisition system, where signals generated by signal reception device SRD are presented to computer 102 through signal conditioning system 108 and data acquisition (DAQ) device 104.
Figure 2B:
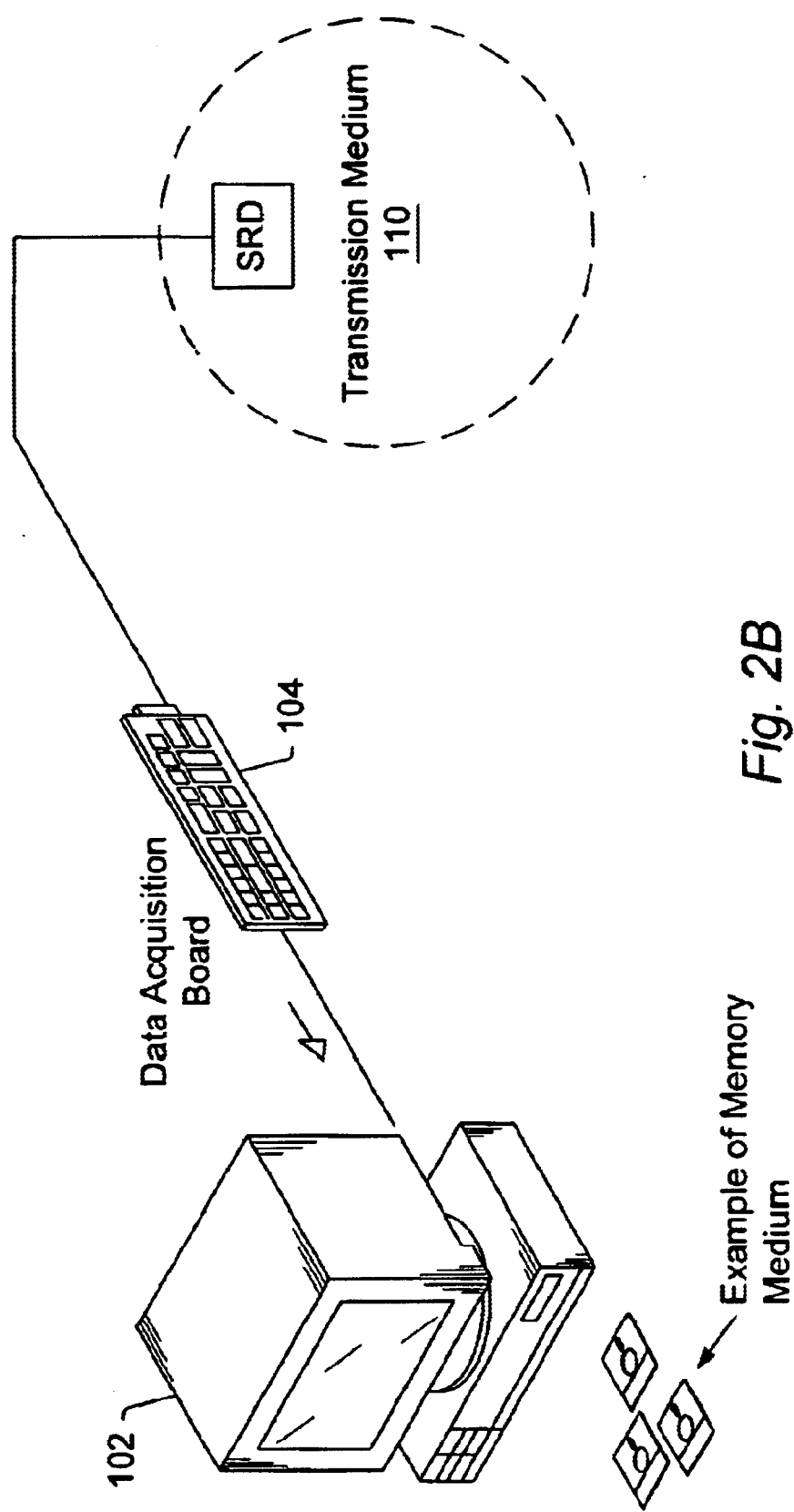
FIG. 2B illustrates a second embodiment of tone detection system 120 comprising a computer-based measurement system, where signals generated by signal reception device SRD are presented to computer system 102 through data acquisition (DAQ) device 104.

FIGS. 2A and 2B

FIG. 2A and 2B illustrate exemplary embodiments of tone detection system 120. As shown, tone detection system 120 may comprise a computer 102, a data acquisition (DAQ) device 104 coupled to the computer 102, and optionally a signal conditioning system 108 coupled to the DAQ device 104. Signal reception device SRD may comprise transducers, sensors, and/or receiving devices that couple to DAQ device 104 through the signal conditioning circuitry 108.

As shown, signal reception device SRD is configured and/or coupled to acquire signals from the transmission medium 110. The input signals acquired by signal reception device SRD may be optionally conditioned by the signal conditioning system 108 as shown in FIG. 2A. The conditioned input signals may then be provided to DAQ device 104 as shown. Signal conditioning system 108 may connect to DAQ device 104 via one or more cables.

In one embodiment, signal conditioning system 108 may comprise an external chassis 122 housing one or more signal conditioning modules 124 and optionally terminal blocks 126. Signal conditioning system 108 may be used to perform signal conditioning on the signals generated by signal reception device SRD. As used herein, the term "signal conditioning" may include one or more of amplifying, linearizing, limiting, isolating, filtering, switching and/or multiplexing signals), among other signal processing functions. Signal conditioning system 108 may advantageously reduce the level of noise in the signals transmitted to DAQ device 104. DAQ device 104 may receive conditioned signals from signal conditioning system 108 as shown in FIG. 2A. Alternatively, DAQ device 104 may directly receive the input signal from signal reception device SRD as shown in FIG. 2B. DAQ device 104 may operate to perform analog to digital (AD) conversion and provide the resultant digital signals to computer 102 for processing.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (AD) conversion circuitry and/or digital to analog (DA) conversion circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Tone detection system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks 104; a computer system memory or random access memory such as DRAM, SRAM, EDO RAM, Rambus RAM, EPROM, EEPROM etc.; or a non-volatile memory such as a magnetic media, e.g., a hard drive, or optical storage. The memory medium may comprise other types of memory as well, or combinations thereof In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program according to one embodiment of the present invention for detecting one or more tones in the input signal. More particularly, the software program may be operable to analyze the input signal to determine the frequency, phase and amplitude of one or more tones in the input signal.

The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A processor, such as the host CPU, executing code and data from the memory medium, or a programmable device configured according to a net list, may comprise embodiments of a means for determining the frequency, phase and amplitude of the one or more tones embedded in the input signal according to the methods described below.

As noted above, the tone detection system 120 may also or instead include reconfigurable logic or programmable logic, such as an FPGA, that implements the methods described herein.

Various embodiments further include receiving, storing, and/or transmitting instructions and/or data implemented according to the present invention upon a carrier medium. Suitable carrier media include a memory medium as described above, as well as signals such as electrical, electromagnetic, or digital signals, conveyed via a communication medium such as networks and/or a wireless link.

Figure 3:
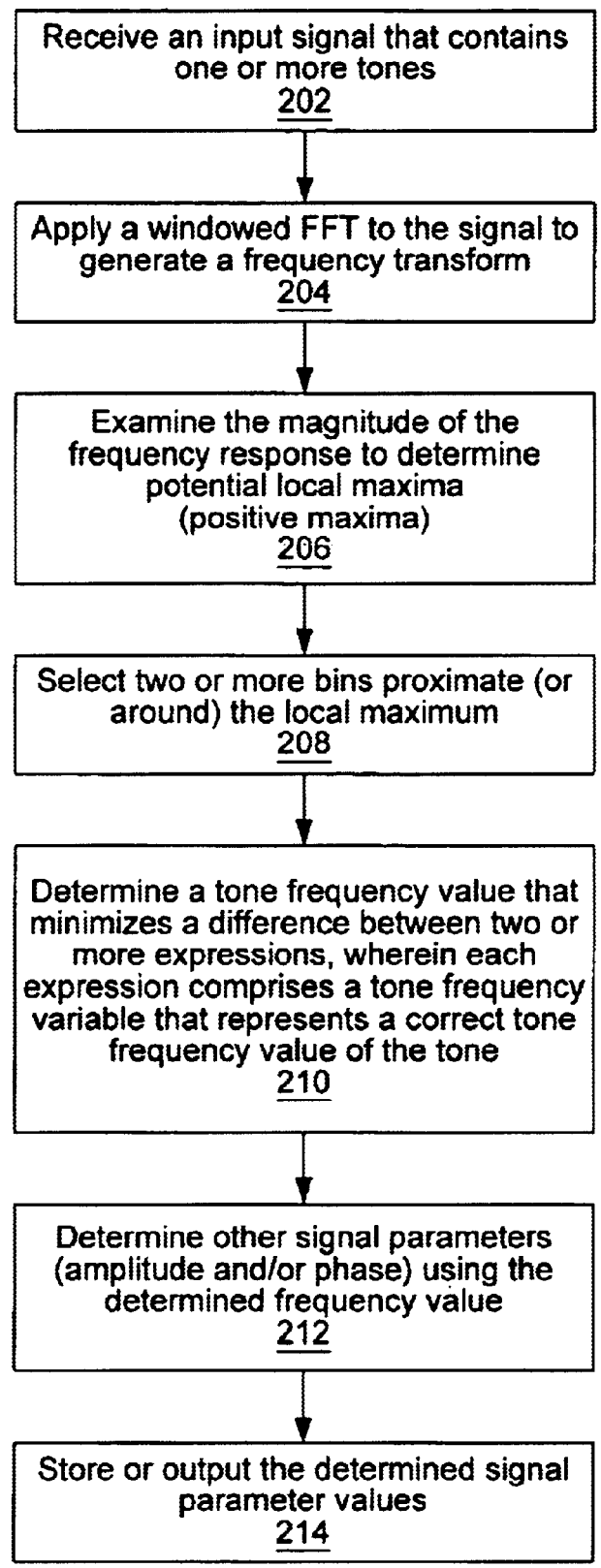
FIG. 3 presents a flowchart for one embodiment of a tone detection system according to the present invention.

FIG. 3—Determining Signal Parameters of a Tone

FIG. 3 illustrates one embodiment of a method for determining one or more signal parameters, e.g., one or more of the frequency, amplitude and/or phase, of one or more tones present in the input signal. In one aspect, the method may be referred to as an aliasing compensation method for compensating for the effects of the negative image of a tone on the positive image of the tone. In another aspect, the method may be used to more correctly identify signal parameters of one or more tones in a signal, compensating for the effects of the negative image of the tone, and the positive and/or negative images of other tones present in the signal.

The method of FIG. 3 may be implemented by execution of a computer program stored on the memory medium as described above. The method may also be implemented in programmable logic, such as an FPGA. The method may also be implemented by a combination of hardware and software, as desired. It is noted that various steps may be performed concurrently or in a different order than that shown, and/or some steps may possibly be omitted, as desired.

In step 202 the method may receive samples x(n) of the input signal, wherein the input signal includes the tone (or one or more tones). The samples x(n) may be provided by signal reception device SRD or may be received from a memory medium, e.g., having been previously recorded/captured from signal reception device SRD. Alternatively, the input signal samples may be simulated samples generated by a simulator (e.g. a CPU executing simulation code). Various embodiments of the invention contemplate a wide variety of possible sources for the input signal samples x(n).

The input signal may comprise a single sinusoidal tone in the presence of noise. Thus, the input signal and/or the tone may be modeled by the expression:

$$x(n)=A_i\cos(2\pi f_i n+\phi_i)$$

Where $A_i$ is the amplitude of the tone, $f_i$ is the normalized frequency of the tone, n is from 0 to N−1, and $\phi_i$ is the initial phase of the tone.

Figure 4:
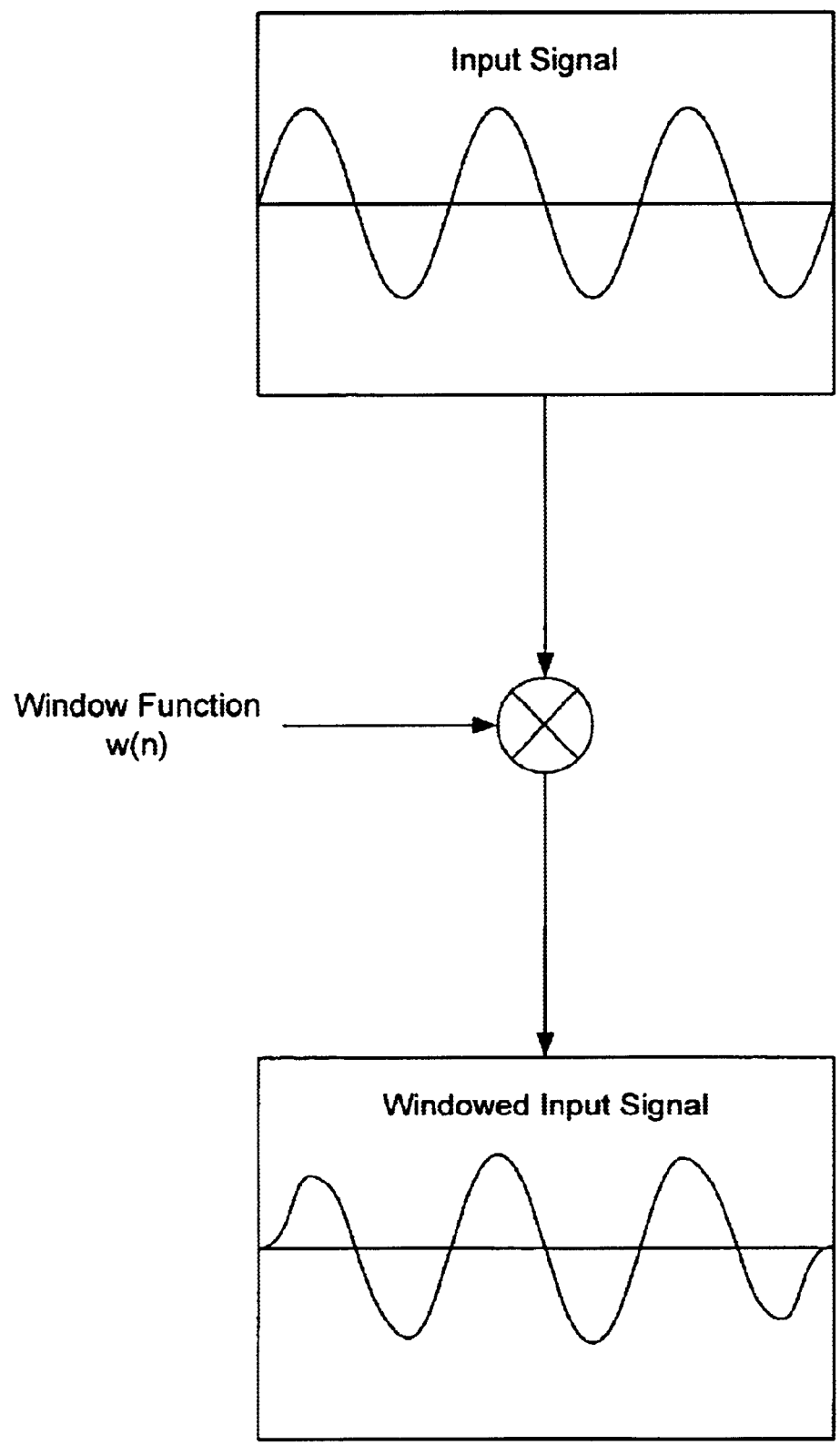
FIG. 4 illustrates a windowing operation being performed on an input signal to generated a windowed input signal.

In step 204 the CPU 140 may multiply the input samples by a known window function w(n) to generate a windowed input signal y(n)=w(n)*x(n) as suggested by FIG. 4. Alternatively, the CPU 140 may receive, e.g., in step 202, a discrete set of samples, which effectively form a windowed version of the signal. The window function w(n) may have any of a variety of forms. For example, the window function may be a rectangular window, a triangular window, a raised cosine window, a Hanning window, etc. The window function may, for example, be any type of cosine window, such as a Hanning, Hamming, Blackman Harris, and Flat Top window, among others.

In step 204, the method may also perform a frequency transform, such as the discrete Fourier transform (DFT), e.g., an FFT (Fast Fourier Transform), on the windowed input signal y(n) to generate a transform array F(n), where n is a frequency bin index which may range from 0 to N−1, or any interval of length N, where N is a positive integer. In one embodiment or one example, the transform array F(n) may be modeled by the transform of the sinusoidal tone, i.e., $$F(n)=A_i e^{-j\phi_i}W(f_n+f_i)+A_i e^{j\phi_i}W(f_n-f_i)$$

where W(f) represents the Fourier transform of the window w(n). It is noted that the relationship between frequency f and frequency bin number k is given by $$f=f_s*(k/N),$$

where $f_s$ is the sample rate. The magnitude of the window transform W(f) typically has even symmetry and attains a maximum at f=0. Thus, the function $W(f-f_i)$ attains a maximum magnitude at frequency $f=f_i$, and the function $W(f+f_i)$ attains a maximum magnitude at frequency $f=-f_i$. The first term in the expression above, i.e., $$P(f)=(A/2)\exp(j\phi)W(f-f_i),$$

is referred to herein as the "positive-frequency image" since its center frequency occurs at the positive frequency $f_i$. The second term in the expression above, i.e., $$N(f)=(A/2)\exp(-j\phi)W(f+f_i)$$

is referred to herein as the "negative-frequency image" since its center frequency occurs at the negative frequency $-f_i$. Thus, the transform array F(n) may include a positive-frequency image and negative-frequency image which combine additively (in the sense of complex addition). The input signal may also include noise, other spurious tones, or other valid tones.

If tone frequency $f_i$ stays away from zero or $f_s/2$, and/or the sample size N is sufficiently large, the overlap between the positive and negative frequency images may be small, and thus, their individual identities may be apparent in the transform array F(n). The magnitude function |F(n)| will thus exhibit two peaks which correspond to the positive and negative frequency images. The frequency locations of one of these peaks (i.e., the peak that occurs in the range of positive frequencies) may be used as an estimate for the tone frequency $f_i$.

Conversely, if the tone frequency is close to zero or $f_s/2$, and/or, the sample size N is sufficiently small, the positive-frequency image and negative frequency image may overlap significantly. Thus, their individual identities may not be apparent in the transform array F(n). In other words, transform array F(n) restricted to positive frequencies may be a poor approximation to the positive frequency image. Thus, the frequency location at which the magnitude function |F(n)| attains a maximum, when considered over positive frequencies, may only be a crude initial approximation to the tone frequency $f_i$.

Figure 5:
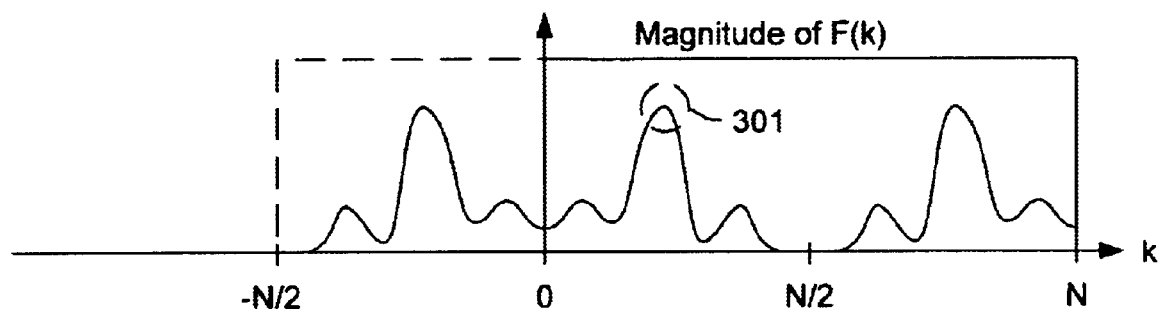
FIG. 5 illustrates the magnitude of transform array F(k) for a typical windowed input signal comprising a single sinusoidal tone.

FIG. 5 is a plot of the magnitude of transform F(n) corresponding to a typical windowed input signal x(n). Note that the transform F(n) has a symmetry given by F(n)=F(k+N) for any integer k. In particular, F(−k)=F(N−k). Thus, frequency bin numbers between N/2 and N may be interpreted as negative frequencies.

In step 206, method may identify a frequency location proximate to an amplitude peak in the frequency transform, wherein the amplitude peak may correspond to the tone. For example, in step 206 the method may determine the maximum amplitude peak in the input signal, which is presumed to be the peak of the tone. In one embodiment, the method may scan the DFT magnitude values |F(n)| over the range of positive frequency bins to determine the potential local positive maximum amplitude, e.g., to determine the bin index k which achieves the maximum magnitude. Where multiple tones are present in the input signal, the method may find multiple amplitude peaks and select one for subsequent processing.

In step 208 the method may select two or more frequency bins proximate to the identified frequency location in the frequency transform. Thus the method may select two or more bins proximate to (or around) the positive maximum determined in 206. The method preferably selects frequency bins located on either side of the frequency location of the amplitude peak. In other words, at least one of the two or more frequency bins is on each side of the frequency location, i.e., one or more bins on a first side of the frequency location of the amplitude peak and one or more bins on the other side of the frequency location of the amplitude peak. In one embodiment, in step 208 the method may select several bins k that are in the neighborhood of $k_{max}$, wherein $k_{max}$ is the integer bin index value k in the range from 0 to N/2 which maximizes the magnitude of F(n).

Figure 6:
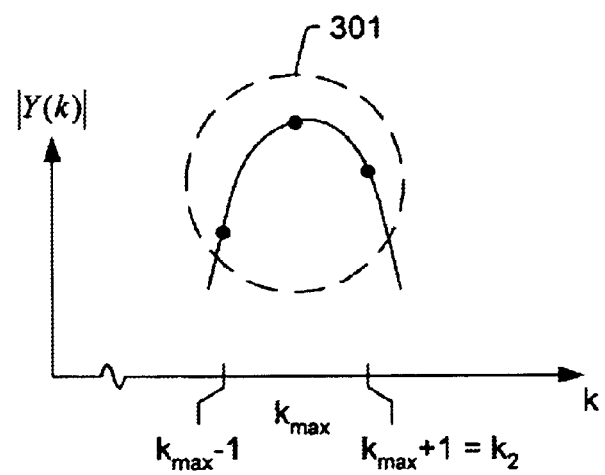
FIG. 6 illustrates a blowup of a generic magnitude peak 301 from the magnitude spectrum of FIG. 5.

It is noted that the maximum of magnitude function |F(n)| considered as a function of continuous frequency typically does not occur at the integer value $k_{max}$, although it should occur somewhere in the interval between $k_{max}$ and $k_2$. FIG. 6 illustrates a blowup of the positive frequency magnitude peak 301 in the neighborhood of bin index value $k_{max}$. In the example of FIG. 6, the method may select $k_{max}-1$ and $k_{max}+1$ as the bins proximate to the frequency producing the positive maximum amplitude. In the preferred embodiment, the method selects three frequency bins for processing. However, the method may select 2, 3, 4, or a greater number of bins, as desired.

In step 210 the method may determine a tone frequency value that minimizes a difference between two or more expressions, e.g., at least a first expression and a second expression. Stated another way, the method may involve selecting a tone frequency value that makes a plurality of expressions most nearly equal.

Each of the plurality of expressions may comprise a sum of one or more numerator terms divided by a sum of one or more denominator terms, wherein each of the plurality of expressions includes a tone frequency variable, wherein each numerator term and each denominator term corresponds to one of the frequency bins, and wherein a ratio of each numerator term and its corresponding denominator term represent a complex amplitude of the tone at a respective bin.

Thus, for example, the first expression may comprise a sum of two or more numerator terms divided by a sum of two or more denominator terms, wherein the first expression includes a tone frequency variable. In a similar manner, the second expression may comprise a sum of one or more of the numerator terms divided by a sum of one or more of the denominator terms, wherein the second expression includes the tone frequency variable. The number of numerator terms and corresponding denominator terms in the first expression are preferably different than the number of numerator terms and corresponding denominator terms in the second expression.

In each expression, each numerator term and its corresponding denominator term correspond to one of the frequency bins. In one embodiment, a ratio of each numerator term and its corresponding denominator term represent a complex amplitude of the tone at a respective bin. In each expression, the tone frequency variable may represent a correct tone frequency value of the tone. The first expression may be approximately equivalent to the second expression when the correct tone frequency value is used for the tone frequency variable in the first and second expressions.

As one example of the expressions used, where two frequency bins are selected, the first expression may comprise a sum of two numerator terms divided by a sum of the corresponding two denominator terms, wherein the two numerator terms and the two denominator terms correspond to the two frequency bins. The second expression may comprise one numerator term divided by one corresponding denominator term corresponding to one of the two frequency bins.

As another example, where three frequency bins are selected, the first expression may comprise a sum of three numerator terms divided by a sum of the corresponding three denominator terms, wherein the three numerator terms and the three denominator terms correspond to the three frequency bins. The second expression may comprise a sum of two of the three numerator terms divided by a sum of two of the three corresponding denominator terms, corresponding to two of the three frequency bins.

The step of determining a tone frequency value may comprise computing a plurality of differences between the first expression and the second expression for different respective tone frequency values of the tone frequency variable, and then selecting the tone frequency value that produces a smallest difference. The method may compute the plurality of differences by performing a Newton-Rhapson root finding method, as is known in the art.

The expressions may be real expressions or complex expressions. Where the expressions are complex expressions, the method may involve minimizing a difference between an amplitude of the first complex expression and an amplitude of the second complex expression.

In one embodiment, the first expression and the second expression have the form:

$$\frac{\left|\sum_{k+1}^{k+M}(F(n)W^*(f_n-f_i)-F^*(n)W(f_n+f_i))\right|}{\left|\sum_{k+1}^{k+M}(|W(f_n-f_i)|^2-|W(f_n+f_i)|^2)\right|} =$$

$$\frac{\left|\sum_{k+1}^{k+M-1}(F(n)W^*(f_n-f_i)-F^*(n)W(f_n+f_i))\right|}{\left|\sum_{k+1}^{k+M-1}(|W(f_n-f_i)|^2-|W(f_n+f_i)|^2)\right|}$$

wherein:

F(n) is the nth value of the single sided scaled FFT spectrum; and

W represents a window function, wherein the window function is shifted by a value of the tone frequency variable $f_i$.

Introducing the Function G(f):

$$G(f) = \left|\sum_{k+1}^{k+M}(F(n)W^*(f_n-f)-F^*(n)W(f_n+f))\right| \times$$

$$\left|\sum_{k+1}^{k+M-1}(|W(f_n-f)|^2-|W(f_n+f)|^2)\right| -$$

$$\left|\sum_{k+1}^{k+M-1}(F(n)W^*(f_n-f)-F^*(n)W(f_n+f))\right| \times$$

$$\left|\sum_{k+1}^{k+M}(W(f_n-f)^2-|W(f_n+f)|^2)\right|$$

This results in:

G(f)=0

This equation is a function of f, and this equation can be solved by applying Newton Raphson's root finding algorithm to determine the tone frequency $f_i$. The theory behind the use of these expressions is discussed further below.

When the frequency transform of the samples computed in 204 comprises generating a power spectrum of the samples, the first expression and the second expression have the form:

$$\left|\frac{\sum_{k+1}^{k+M}(|F(n)|\times|W(f_n-f_i)|)}{\sum_{k+1}^{k+M}|W(f_n-f_i)|^2}\right| = \left|\frac{\sum_{k+1}^{k+M-1}(|F(n)|\times|W(f_n-f_i)|)}{\sum_{k+1}^{k+M-1}|W(f_n-f_i)|^2}\right|$$

wherein:

F(n) is the nth value of the single sided scaled FFT spectrum; and

W represents a window function, wherein the window function is shifted by a value of the tone frequency variable $f_i$.

Let:

$$G(f) = \sum_{k+1}^{k+M}(|F(n)|\times|W(f_n-f)|) \times \sum_{k+1}^{k+M-1}|W(f_n-f)|^2 -$$

$$\sum_{k+1}^{k+M-1}(|F(n)|\times|W(f_n-f)|) \times \sum_{k+1}^{k+M}|W(f_n-f)|^2$$

This results in:

G(f)=0

Again, Newton Raphson root finding may be performed to solve for the frequency of the tone. The theory behind the use of these expressions is discussed further below.

The tone frequency value determined in step 210 may comprise the correct frequency of the tone. As used herein, the term "correct" includes correct or substantially correct. In other words, the determined tone frequency value represents a good approximation of the correct tone frequency value. The method described herein operates to find a more exact approximation of the frequency of the tone, even in the presence of noise or interference from other tones (i.e., the positive and/or negative images from other tones), or the negative image of the respective tone being found. The method is also more computationally efficient than prior art techniques.

Where the input signal comprises a plurality of tones, the method may operate to correctly find signal parameters of a first tone of the plurality of tones. Where it is desired to locate two or more of, or all of, the tones present in the input signal, steps 206–210 may be iteratively performed for each of the plurality of tones to determine at least one signal parameter for each of the plurality of tones in the input signal.

After the tone frequency value has been determined in step 210, in step 212 the method may then optionally compute one or more of the amplitude and phase of the tone using the determined tone frequency value. For example, wherein the FFT spectrum is available, once the $f_i$ value is known, the amplitude and phase can be computed as:

$$A_i e^{j\varphi_i} = C = \frac{\sum_{k+1}^{k+M}(F(n)W^*(f_n - f_i) - F^*(n)W(f_n + f_i))}{\sum_{k+1}^{k+M}(|W(f_n - f_i)|^2 - |W(f_n + f_i)|^2)}$$

Where the FFT power spectrum is available, once the frequency is known, the amplitude can be computed as:

$$A_i = \left|\frac{\sum_{k+1}^{k+M}(|F(n)| \times |W(f_n - f_i)|)}{\sum_{k+1}^{k+M}|W(f_n - f_i)|^2}\right|$$

In step 214 the method may then comprise storing the determined tone frequency value, as well as the amplitude and/or phase if these are computed, in a memory, or outputting the determined tone frequency value, amplitude and/or phase, e.g., on a display.

Theory of Operation of the Expressions

The following describes the derivation and theory behind the expressions used in the preferred embodiment.

As noted above, given a single tone signal in the time domain, the input signal comprising the tone can be expressed in following form:

$$x(n) = A_i \cos(2\pi f_i n + \phi_i) \quad (1)$$

Where $A_i$ is the amplitude, $f_i$ is the normalized frequency, n is from 0 to N−1 and $\phi_i$ is the initial phase. Here the subscript "i" is used to represent a single tone in what could be a multitone signal.

If the FFT is computed based on the windowed version of x(n) as performed in step 204, then in the frequency domain, as noted above, each FFT bin can be computed as follows:

$$F(n) = A_i e^{-j\phi_i} W(f_n + f_i) + A_i e^{j\phi_i} W(f_n - f_i) \quad (2)$$

In the above equation, the first term of the equation represents the negative image of the tone and the second term represents the positive image of the tone.

Each equation can then be converted to a different form. For example, given the following:

$$C = A_i e^{j\phi_i} \quad (3)$$

Then $$F(n) = C^* W(f_n + f_i) + C W(f_n - f_i) \quad (4)$$

Here, F(n) is the nth value of the single sided scaled FFT spectrum.

The windowed frequency response can be easily computed numerically once the window coefficients are known.

Estimate Amplitude/Frequency/Phase based on FFT spectrum

If the FFT spectrum is available, each particular single tone can be roughly determined by finding the local maximum in the sense of amplitude. Here assume F(k+1), F(k+2), ... F(k+M) are the M bins around the single tone. This results in a set of nonlinear equations of:

$$F(n) = C^* W(f_n + f_i) + C W(f_n - f_i) \quad (5)$$

Where n=k+1, k+2, ... k+M;

From this point, the following equation can be derived:

$$C = \frac{F(n)W^*(f_n - f_i) - F^*(n)W(f_n + f_i)}{|W(f_n - f_i)|^2 - |W(f_n + f_i)|^2} \quad (6)$$

For each n=k+1, ... k+M.

Furthermore, to reduce the numerical fluctuation, the equation (7) may be written as follows:

$$\left|\frac{\sum_{k+1}^{k+M}(F(n)W^*(f_n - f_i) - F^*(n)W(f_n + f_i))}{\sum_{k+1}^{k+M}(|W(f_n - f_i)|^2 - |W(f_n + f_i)|^2)}\right| =$$

$$\left|\frac{\sum_{k+1}^{k+M-1}(F(n)W^*(f_n - f_i) - F^*(n)W(f_n + f_i))}{\sum_{k+1}^{k+M-1}(|W(f_n - f_i)|^2 - |W(f_n + f_i)|^2)}\right|$$

This equation is a function of $f_i$, and this equation may be solved in step 210 by applying Newton Raphson's root finding algorithm.

Define G(f):

$$G(f) = \left|\sum_{k+1}^{k+M}(F(n)W^*(f_n - f) - F^*(n)W(f_n + f))\right| \times$$

$$\left|\sum_{k+1}^{k+M-1}(|W(f_n - f)|^2 - |W(f_n + f)|^2)\right| -$$

$$\left|\sum_{k+1}^{k+M-1}(F(n)W^*(f_n - f) - F^*(n)W(f_n + f))\right| \times$$

$$\left|\sum_{k+1}^{k+M}(W(f_n - f)^2 - |W(f_n + f)|^2)\right|$$

$$(8)$$

Now by solving the equation:

$$G(f) = 0 \quad (9)$$

using Newton Raphson's root finding algorithm (or other suitable root find methods), the tone frequency $f_i$ can be determined Once the $f_i$ value is known, the amplitude and phase can be computed as follows:

$$A_i e^{j\varphi_i} = C = \frac{\sum_{k+1}^{k+M}(F(n)W^*(f_n - f_i) - F^*(n)W(f_n + f_i))}{\sum_{k+1}^{k+M}(|W(f_n - f_i)|^2 - |W(f_n + f_i)|^2)} \quad (10)$$

Estimate Amplitude/Frequency based on FFT Power Spectrum

If the FFT power spectrum is available, then the amplitude and frequency of the tone may be estimated based on the FFT power spectrum. Since the phase information is not available in the power spectrum, the effect of the negative frequency cannot be taken into account. The equation for computing the frequency are as follows:

$$\left| \frac{\sum_{k+1}^{k+M}(|F(n)| \times |W(f_n - f_i)|)}{\sum_{k+1}^{k+M}|W(f_n - f_i)|^2} \right| = \left| \frac{\sum_{k+1}^{k+M-1}(|F(n)| \times |W(f_n - f_i)|)}{\sum_{k+1}^{k+M-1}|W(f_n - f_i)|^2} \right| \quad (11)$$

Let equation (12) be:

$$G(f) = \sum_{k+1}^{k+M}(|F(n)| \times |W(f_n - f)|) \times \sum_{k+1}^{k+M-1}|W(f_n - f)|^2 -$$

$$\sum_{k+1}^{k+M-1}(|F(n)| \times |W(f_n - f)|) \times \sum_{k+1}^{k+M}|W(f_n - f)|^2$$

This results in equation (13):

$G(f)=0$

Again, the Newton Raphson root finding method may be applied to solve for the frequency of the tone.

Once the frequency is known, the amplitude can be computed by equation (13) as:

$$A_i = \left| \frac{\sum_{k+1}^{k+M}(|F(n)| \times |W(f_n - f_i)|)}{\sum_{k+1}^{k+M}|W(f_n - f_i)|^2} \right| \quad (14)$$

In one embodiment, the power spectrum may be averaged before applying this tone estimation. The measurement is more stable when using the averaged power spectrum.

Determining a Plurality of Tones

The above method may be used to find a plurality of different tones present within a signal. For example, the above method may be applied iteratively to find each respective tone within the input signal. In one embodiment, as each tone is determined or found, the determined tone may be subtracted out from the input signal to produce a modified input signal, and the method may be then performed on the modified input signal to locate the next tone, and so on.

Applications

Embodiments of the present invention may be used in various applications. In general, embodiments of the present invention may be used in any system where it is desired to detect tones, e.g., sinusoidal tones, present in a signal, e.g., where it is desired to detect the precise frequency, amplitude and/or phase of the tones present in the signal. For example, an embodiment of the present invention may be used in a DTMF (Dual Tone Multi-Frequency) system for detecting tones present in a signal, such as a signal generated by a keypad of a telephone. Embodiments of the present invention are also contemplated for use in applications involving sonar, radar (e.g. Doppler radar), frequency-shift keying applications, mechanical systems analysis, etc. For example, the reflections generated by multiple moving objects in response to a radar pulse have distinct frequencies dependent on their radial velocities with respect to the radar station. Thus, the frequencies of the reflections are usable for tracking the multiple moving objects. In another example, a mechanical system excited with a physical stimulus (e.g. an impulse) may manifest vibrations at one or more frequencies. The frequency, amplitude and/or phase of these vibrations may provide information to a system analyst about the nature of flaws in the mechanical system. Embodiments of the present invention may be used in a wide variety of applications, i.e. in any application where it is desirable to identify one or more tones present in an input signal. The above-mentioned applications are merely representative examples.

Example Graphical Program

FIGS. 7A–11B comprise screen shots of a portion of a graphical program which implements one embodiment of the invention. FIGS. 7A–11B comprise screen shots of a portion of a graphical program or Virtual Instrument (VI) written in the LabVIEW graphical programming language. The graphical program is hierarchical in nature, where FIGS. 7A and 7B comprise the top level front panel and block diagram, and FIGS. 8A/B, 9A/B, 10A/B, and 11A/B are various sub programs or sub-VIs of the program. Various other sub programs or sub-VIs of this graphical program that are not necessary to an understanding of this embodiment of the invention are not included for convenience.

Figure 7A:
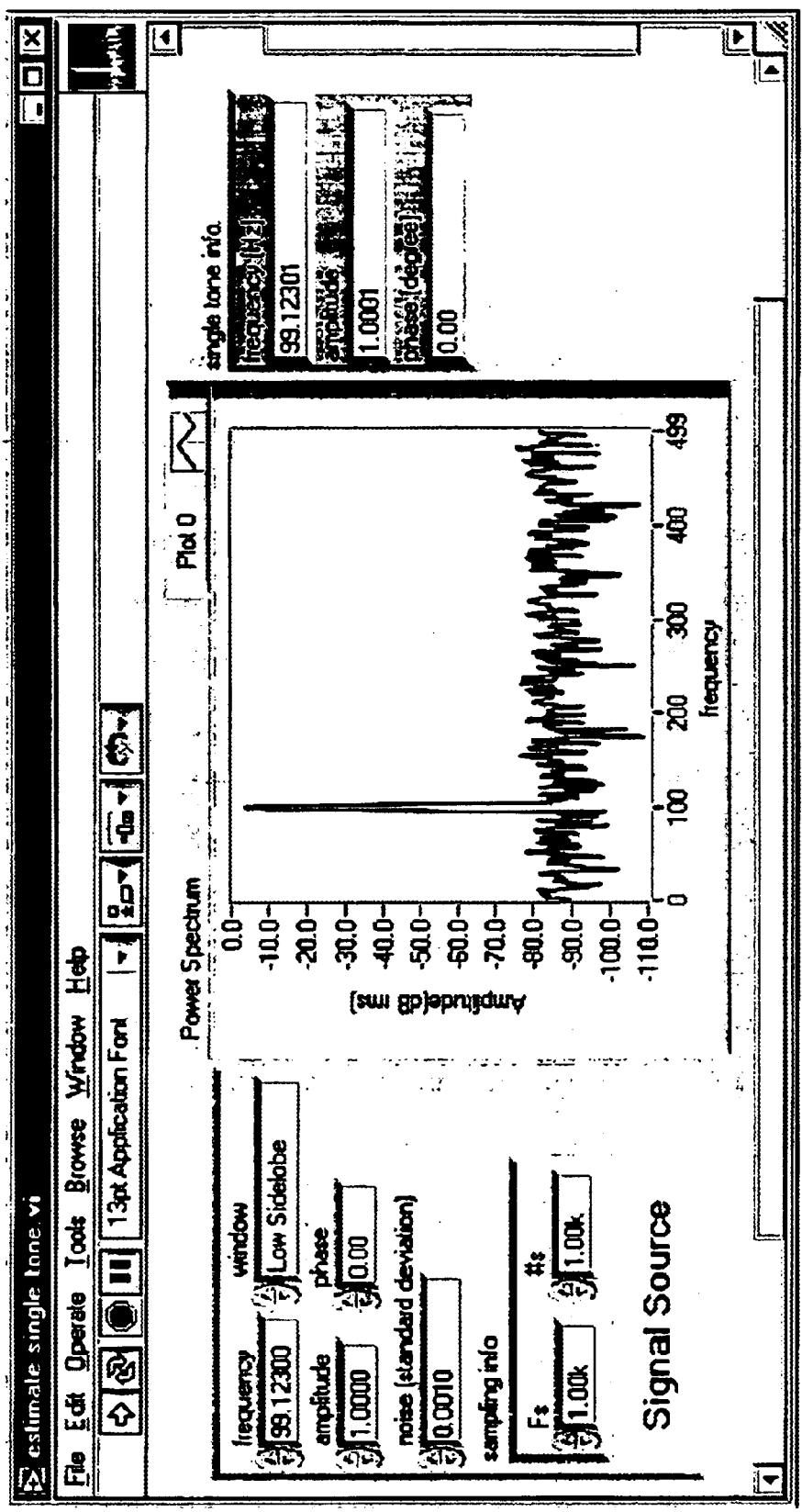
FIGS. 7A and 7B, 8A and 8B, 9A and 9B, 10A and 10B, and 11A and 11B illustrate front panels and block diagrams of a portion of a graphical program that implements one embodiment of the invention.
Figure 7B:
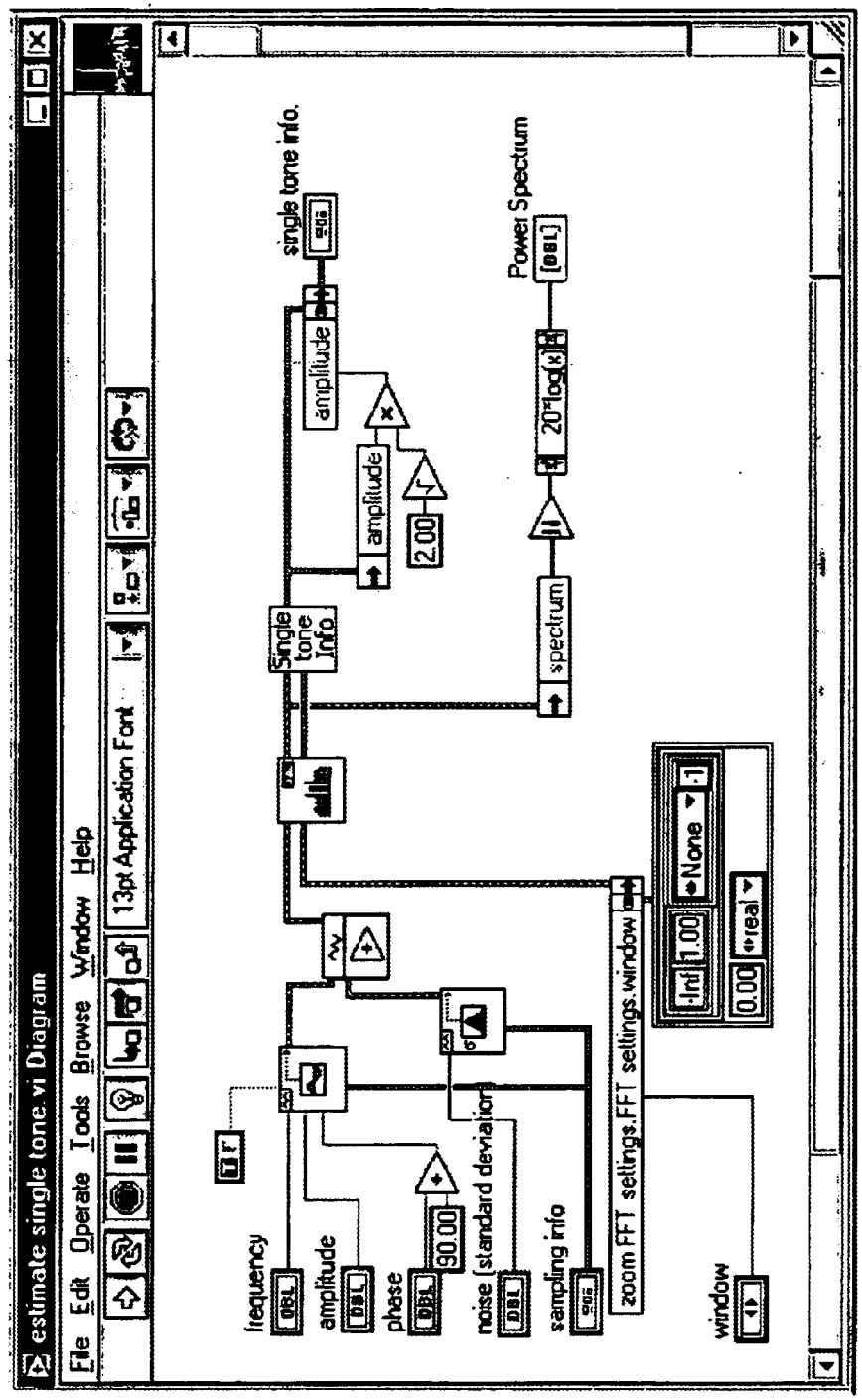

FIGS. 7A and 7B illustrate a top level front panel and block diagram, respectively, of the graphical program titled "estimate single tone". This graphical program includes a block titled "single tone info" ("single tone information").

Figure 8A:
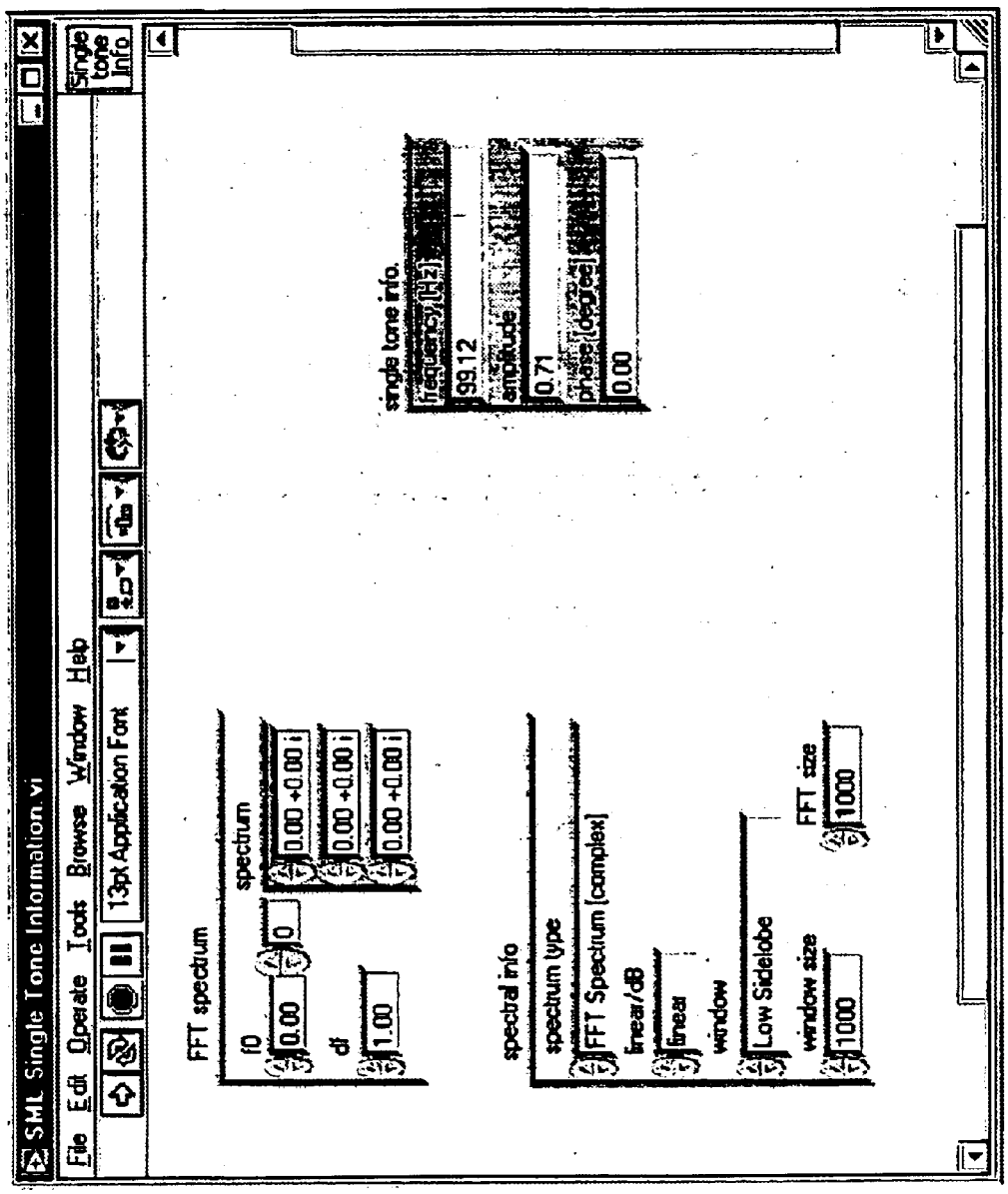
Figure 8B:
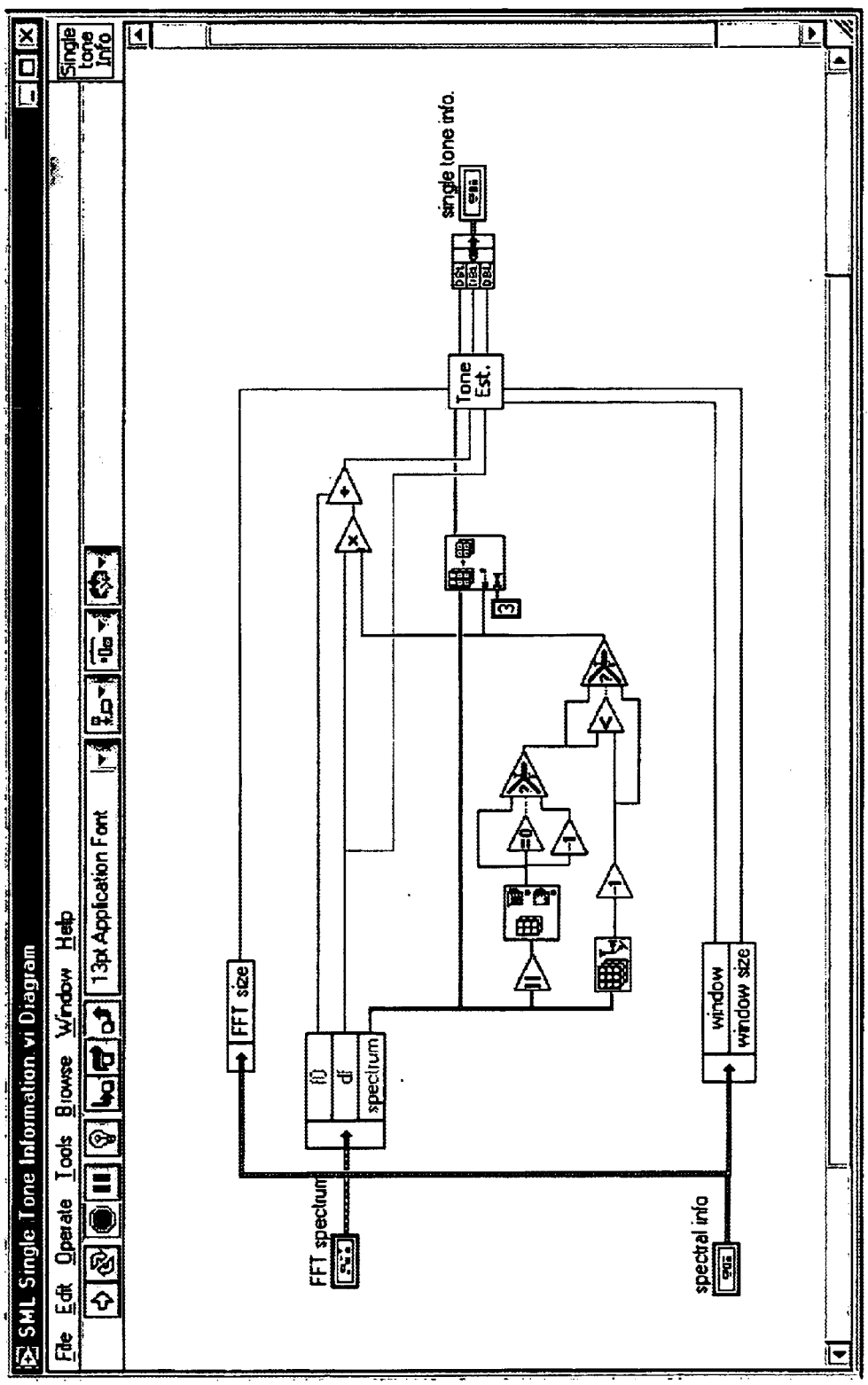

FIGS. 8A and 8B illustrate a front panel and block diagram, respectively, of the graphical program block titled "single tone information" contained in the diagram of FIG. 7B. This graphical program includes a block titled "tone est." ("tone estimation").

Figure 9A:
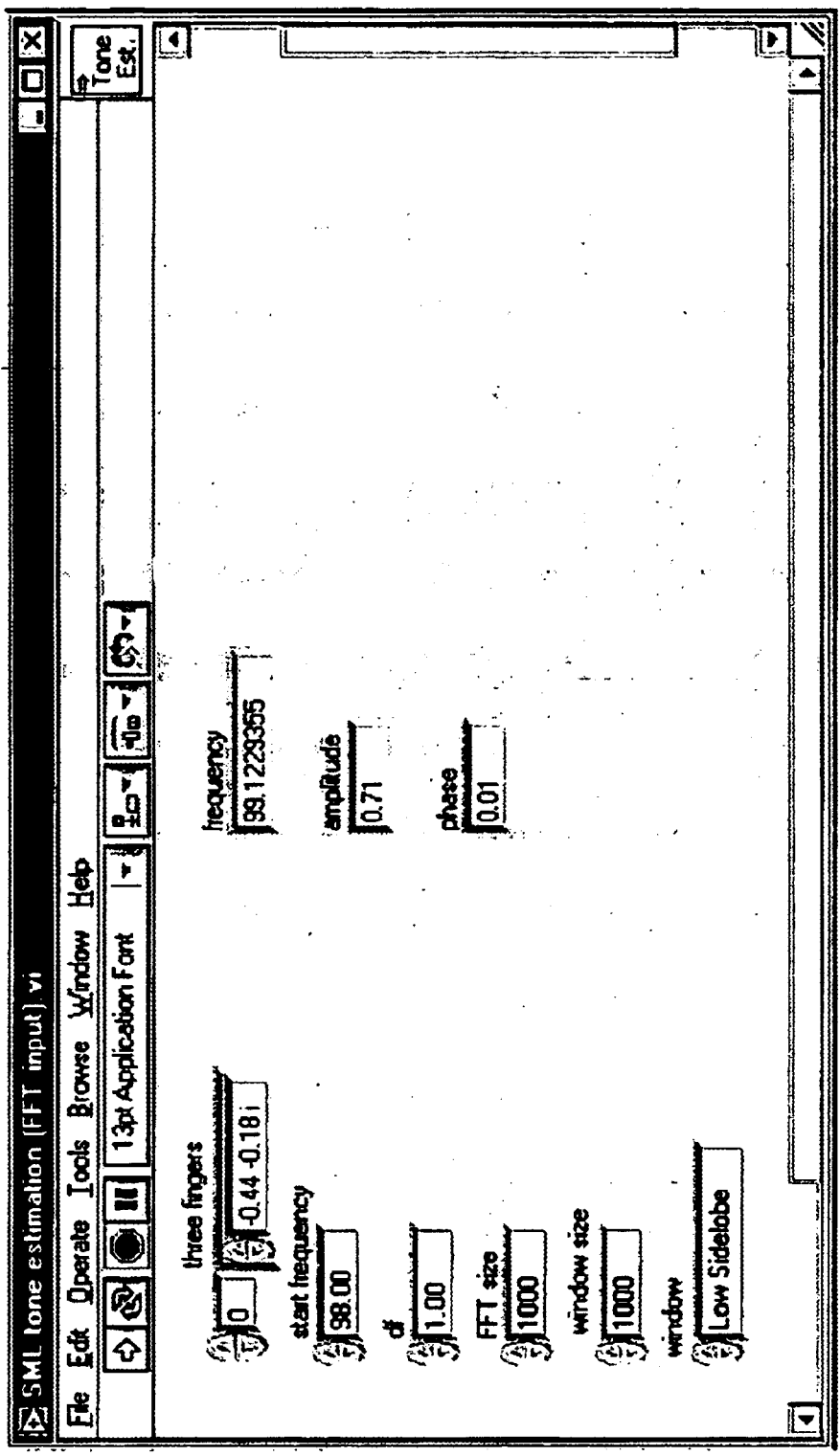
Figure 9B:
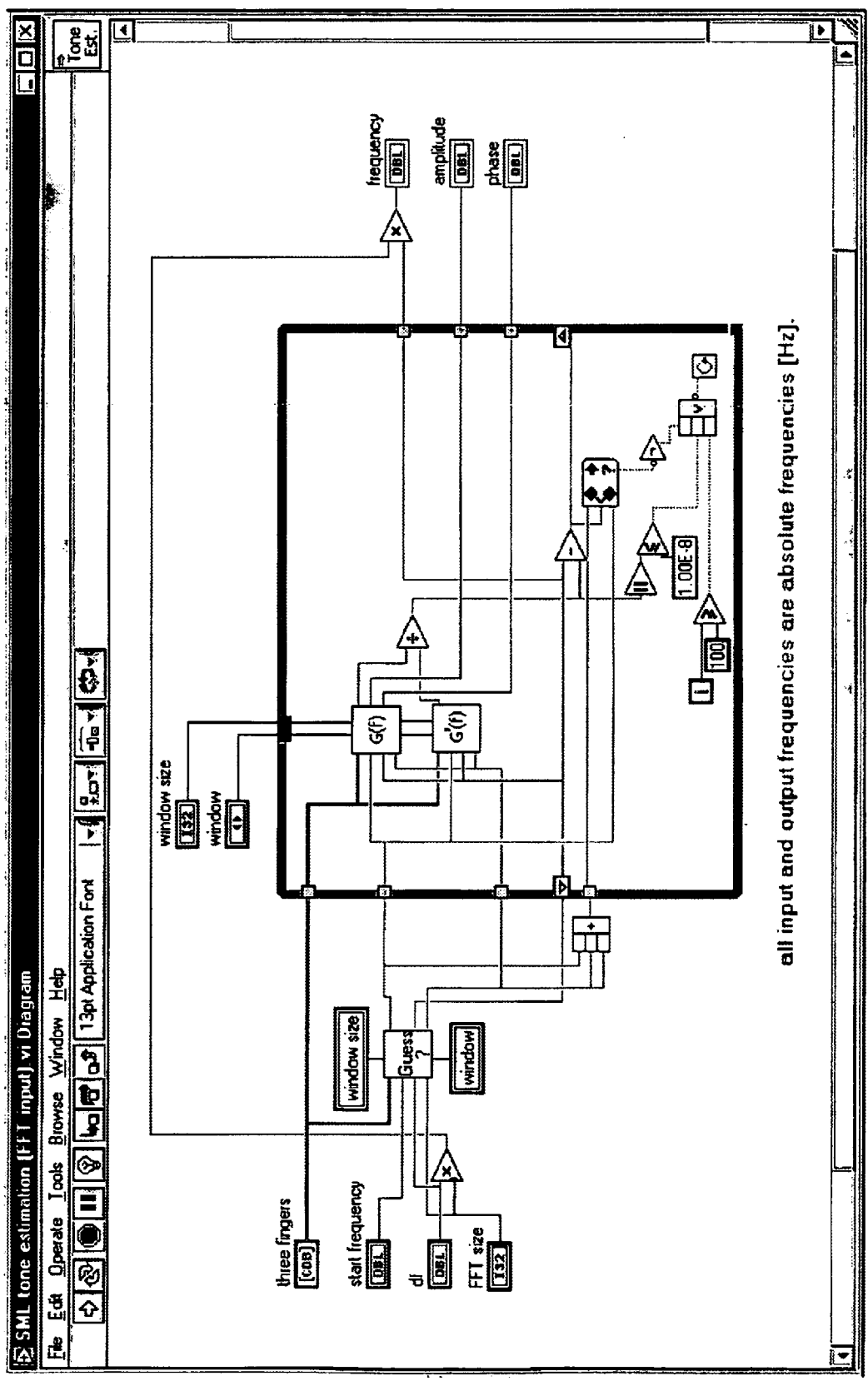

FIGS. 9A and 9B illustrate a front panel and block diagram, respectively, of the graphical program block titled "tone estimation" contained in the diagram of FIG. 8B. This graphical program includes two blocks labeled "G(f)" and "G'(f)".

Figure 10A:
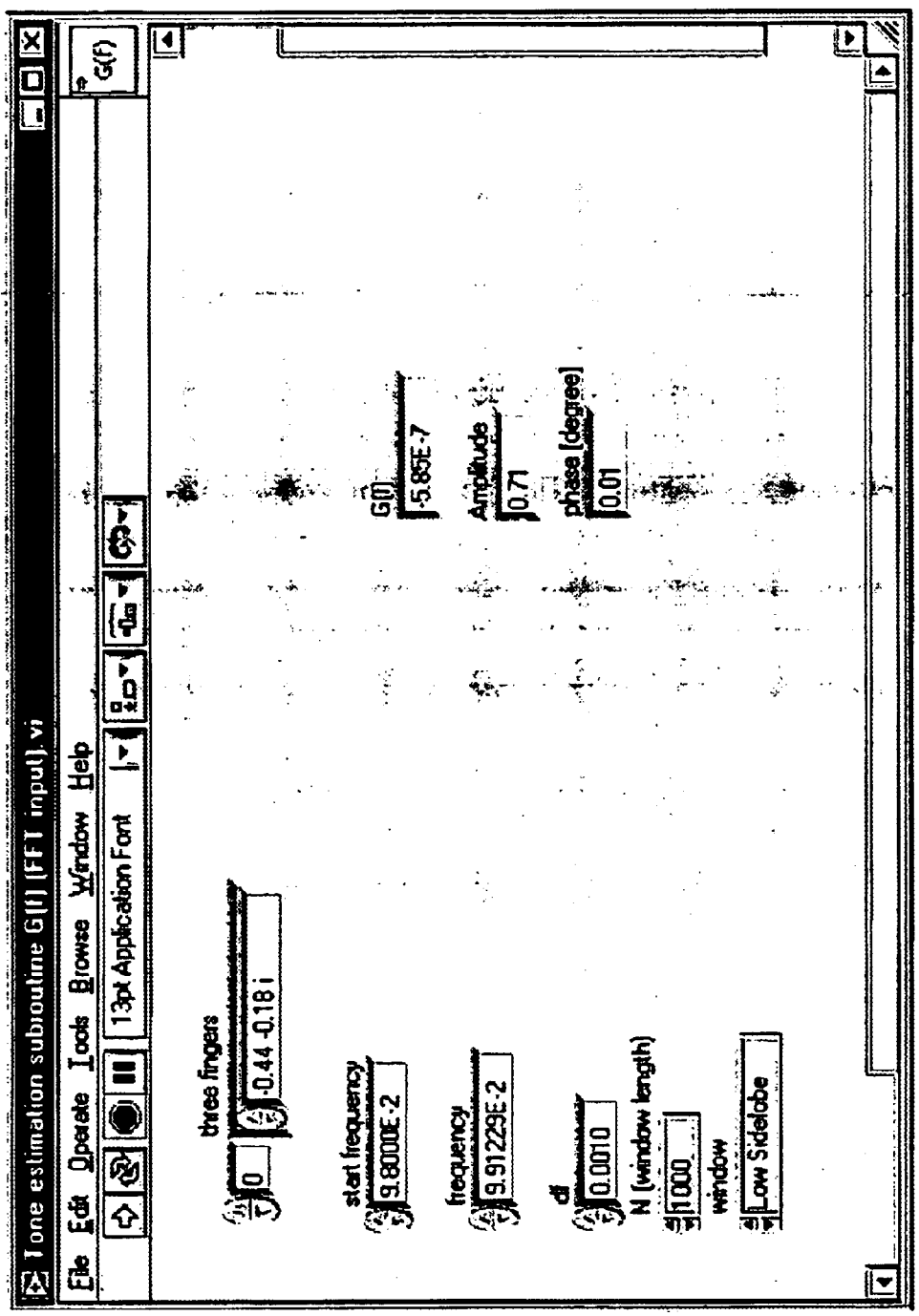
Figure 10B:
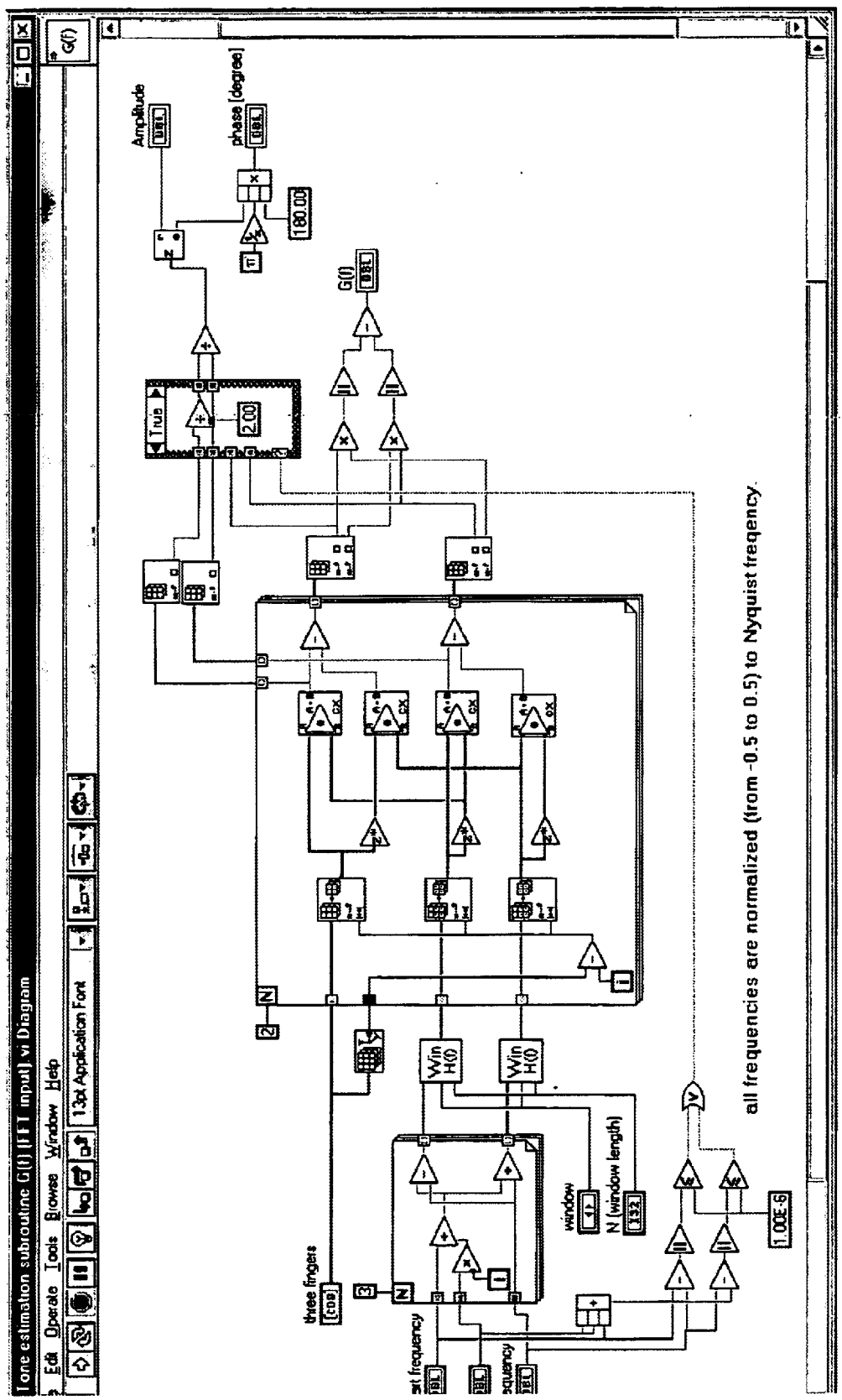

FIGS. 10A and 10B illustrate a front panel and block diagram, respectively, of the graphical program block titled "G(f)".

Figure 11A:
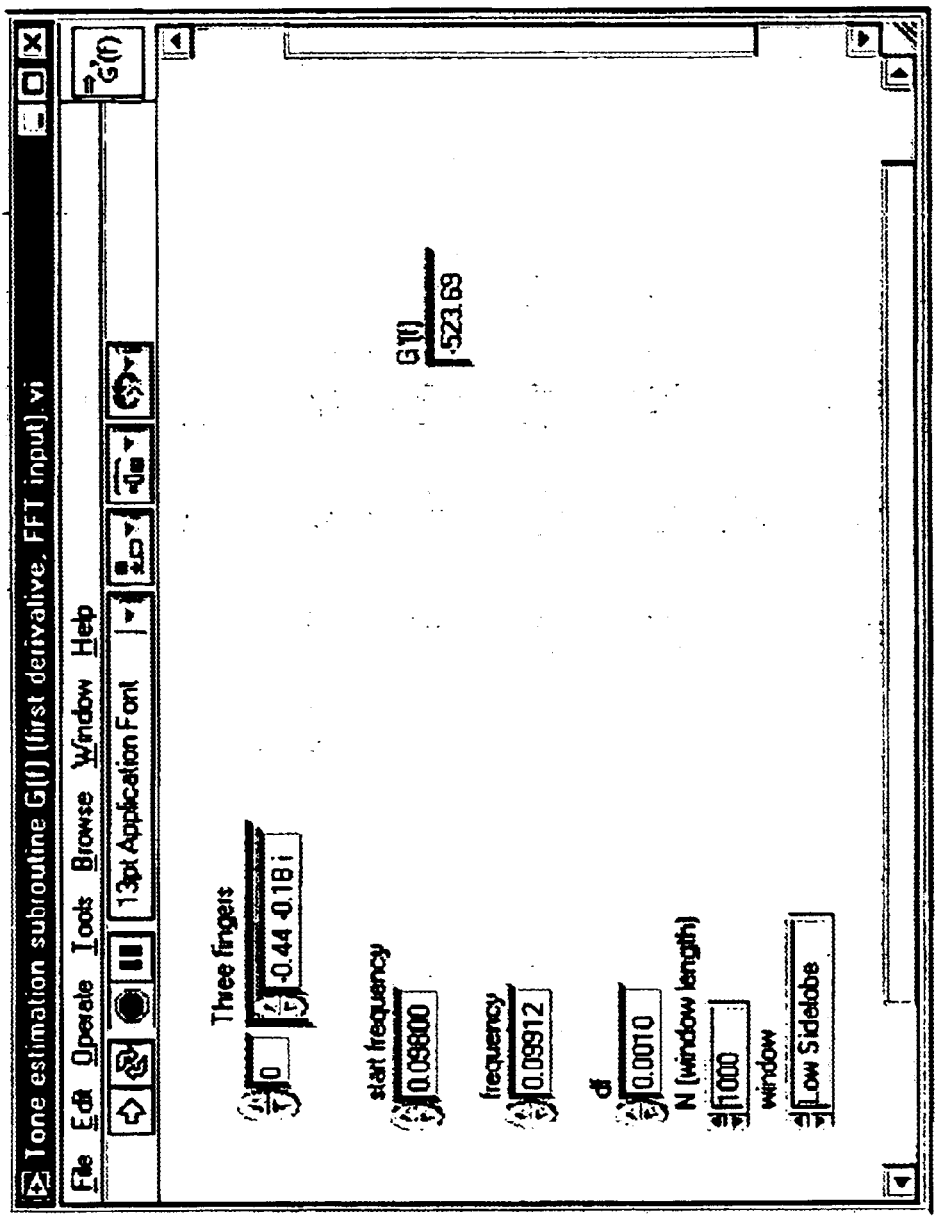
Figure 11B:
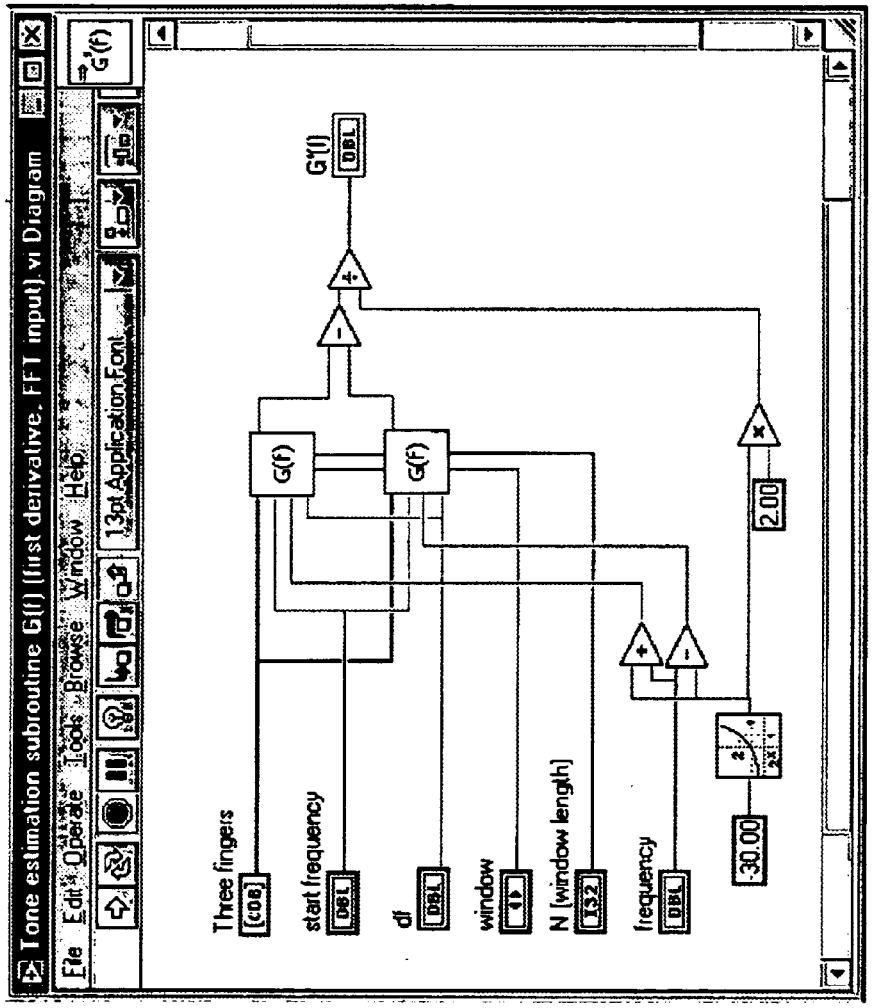

FIGS. 11A and 11B illustrate a front panel and block diagram, respectively, of the graphical program block titled "G'(f)".

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for determining one or more signal parameters for a tone in an input signal, the method comprising:

receiving samples of the input signal, wherein the input signal includes the tone;

generating a frequency transform of the samples;

identifying a frequency location proximate to an amplitude peak in the frequency transform, wherein the amplitude peak corresponds to the tone;

selecting two or more frequency bins proximate to the frequency location in the frequency transform; and determining a tone frequency value that minimizes a difference between at least a first expression and a second expression;
  wherein the first expression comprises a sum of two or more numerator terms divided by a sum of two or more denominator terms, wherein the first expression includes a tone frequency variable;
  wherein each numerator term and each denominator term corresponds to one of the frequency bins; and
  wherein the second expression comprises a sum of one or more of the numerator terms divided by a sum of one or more of the denominator terms, wherein the second expression includes the tone frequency variable;

wherein the tone frequency value comprises a frequency of the tone.

2. The method of claim 1,
wherein the tone frequency variable represents a correct tone frequency value of the tone; and
wherein the determined tone frequency value represents an approximation of the correct tone frequency value.

3. The method of claim 2,
wherein the first expression is approximately equivalent to the second expression when the correct tone frequency value is used for the tone frequency variable in the first and second expressions.

4. The method of claim 1,
wherein a ratio of each numerator term and its corresponding denominator term represent an amplitude of the tone at a respective bin.

5. The method of claim 1,
wherein a ratio of each numerator term and its corresponding denominator term represent a complex amplitude of the tone at a respective bin.

6. The method of claim 1,
wherein said determining a tone frequency value comprises:
  computing a plurality of differences between the first expression and the second expression for different respective tone frequency values of the tone frequency variable; and
  selecting the tone frequency value that produces a smallest difference.

7. The method of claim 6, wherein said computing a plurality of differences comprises performing a Newton-Rhapson root finding method.

8. The method of claim 1,
wherein the first expression and the second expression are each a complex expression.

9. The method of claim 8,
wherein said determining a tone frequency value that minimizes a difference between a first complex expression and a second complex expression comprises determining a tone frequency value that minimizes a difference between an amplitude of the first complex expression and an amplitude of the second complex expression.

10. The method of claim 1, wherein the first expression and the second expression have the form:

$$\left| \frac{\sum_{k+1}^{k+M} (F(n)W^*(f_n - f_i) - F^*(n)W(f_n + f_i))}{\sum_{k+1}^{k+M} (|W(f_n - f_i)|^2 - |W(f_n + f_i)|^2)} \right| = \left| \frac{\sum_{k+1}^{k+M-1} (F(n)W^*(f_n - f_i) - F^*(n)W(f_n + f_i))}{\sum_{k+1}^{k+M-1} (|W(f_n - f_i)|^2 - |W(f_n + f_i)|^2)} \right|$$

wherein:
  F(n) is the nth value of the single sided scaled FFT spectrum; and
  W represents a window function, wherein the window function is shifted by a value of the tone frequency variable $f_i$.

11. The method of claim 1,
wherein said generating a frequency transform of the samples comprises generating a power spectrum of the samples;
wherein the first expression and the second expression have the form:

$$\left| \frac{\sum_{k+1}^{k+M} (|F(n)| \times |W(f_n - f_i)|)}{\sum_{k+1}^{k+M} |W(f_n - f_i)|^2} \right| = \left| \frac{\sum_{k+1}^{k+M-1} (|F(n)| \times |W(f_n - f_i)|)}{\sum_{k+1}^{k+M-1} |W(f_n - f_i)|^2} \right|$$

wherein:
  F(n) is the nth value of the single sided scaled FFT spectrum; and
  W represents a window function, wherein the window function is shifted by a value of the tone frequency variable $f_i$.

12. The method of claim 1, further comprising:
storing the determined tone frequency value in a memory.

13. The method of claim 1, further comprising:
outputting the determined tone frequency value.

14. The method of claim 1, further comprising:
computing one or more of the amplitude and phase of the tone using the determined tone frequency value.

15. The method of claim 1,
wherein at least one of the two or more frequency bins is on each side of the frequency location.

16. The method of claim 1,
wherein said identifying comprises identifying a frequency location of at least one first magnitude peak in the frequency transform; and
wherein said selecting comprises selecting two or more frequency bins proximate to the at least one first magnitude peak in the frequency transform.

17. The method of claim 1,
wherein the input signal comprises a plurality of tones; and
wherein the method operates to find signal parameters of a first tone of the plurality of tones.

18. The method of claim 1,
wherein the input signal comprises a plurality of tones; and wherein said identifying, said selecting, and said determining are performed for each of the plurality of tones to determine at least one signal parameter for each of the plurality of tones in the input signal.

19. A method for determining one or more signal parameters for a tone in an input signal, the method comprising:

receiving samples of the input signal, wherein the input signal includes the tone;

operating on the samples to generate a frequency transform array;

identifying a frequency location of at least one first magnitude peak in the frequency transform array;

selecting two or more frequency bins in a neighborhood of the at least one first magnitude peak in the frequency transform array;

determining a tone frequency value that minimizes a difference between a first expression and a second expression;

wherein the first expression comprises a sum of two or more numerator terms divided by a sum of two or more denominator terms, wherein the first expression includes a tone frequency variable that represents a correct tone frequency value of the tone;

wherein each numerator term and each denominator term corresponds to one of the frequency bins; and wherein the second expression comprises a sum of one or more of the numerator terms divided by a sum of one or more of the denominator terms, wherein the second expression includes a tone frequency variable that represents the correct tone frequency value of the tone;

wherein the determined tone frequency value represents an approximation of the correct tone frequency value.

20. The method of claim 19, wherein the first expression is approximately equivalent to the second expression when the correct tone frequency value is used for the tone frequency variable in the first and second expressions.

21. The method of claim 19, wherein a ratio of each numerator term and its corresponding denominator term represent a complex amplitude of the tone at a respective bin.

22. The method of claim 19, further comprising:

storing the determined tone frequency value in a memory.

23. A method for determining signal parameters for a tone in an input signal, the method comprising:

receiving samples of the input signal, wherein the input signal includes the tone;

generating a frequency transform of the input signal;

identifying two or more frequency bins proximate to a first magnitude peak in the frequency transform; and selecting a tone frequency value that makes a plurality of expressions most nearly equal;

wherein each of the plurality of expressions comprises a sum of one or more numerator terms divided by a sum of one or more denominator terms, wherein each of the plurality of expressions includes a tone frequency variable;

wherein each numerator term and each denominator term corresponds to one of the frequency bins; and wherein a ratio of each numerator term and its corresponding denominator term represent a complex amplitude of the tone at a respective bin;

wherein the tone frequency value comprises a frequency value of the tone.

24. The method of claim 23, wherein the tone frequency variable represents a correct tone frequency value of the tone;

wherein the determined tone frequency value represents an approximation of the correct tone frequency value.

25. The method of claim 24, wherein the first expression is approximately equivalent to the second expression when the correct tone frequency value is used for the tone frequency variable in the first and second complex expressions.

26. The method of claim 23, wherein said determining a tone frequency value comprises:

computing a plurality of differences between the first expression and the second expression for different respective tone frequency values of the tone frequency variable; and selecting the tone frequency value that produces a smallest difference.

27. The method of claim 23, wherein a ratio of each numerator term and its corresponding denominator term represent a complex amplitude of the tone at a respective bin.

28. The method of claim 23, wherein the first expression and the second expression have the form:

$$\left| \frac{\sum_{k+1}^{k+M} (F(n)W^*(f_n - f_i) - F^*(n)W(f_n + f_i))}{\sum_{k+1}^{k+M} (|W(f_n - f_i)|^2 - |W(f_n + f_i)|^2)} \right| =$$

$$\left| \frac{\sum_{k+1}^{k+M-1} (F(n)W^*(f_n - f_i) - F^*(n)W(f_n + f_i))}{\sum_{k+1}^{k+M-1} (|W(f_n - f_i)|^2 - |W(f_n + f_i)|^2)} \right|$$

wherein:

F(n) is the nth value of the single sided scaled FFT spectrum; and

W represents a window function, wherein the window function is shifted by a value of the tone frequency variable $f_i$.

29. The method of claim 23, wherein said generating a frequency transform of the samples comprises generating a power spectrum of the samples;

wherein the first expression and the second expression have the form:

$$\left| \frac{\sum_{k+1}^{k+M} (|F(n)| \times |W(f_n - f_i)|)}{\sum_{k+1}^{k+M} |W(f_n - f_i)|^2} \right| = \left| \frac{\sum_{k+1}^{k+M-1} (|F(n)| \times |W(f_n - f_i)|)}{\sum_{k+1}^{k+M-1} |W(f_n - f_i)|^2} \right|$$

wherein:

F(n) is the nth value of the single sided scaled FFT spectrum; and

W represents a window function, wherein the window function is shifted by a value of the tone frequency variable $f_i$.

30. The method of claim 23, further comprising:
storing the determined tone frequency value in a memory.
31. The method of claim 23, further comprising:
outputting the determined tone frequency value.
32. The method of claim 23, further comprising:
computing one or more of the amplitude and phase of the tone using the determined tone frequency value.
33. The method of claim 23, wherein the plurality of expressions include:
a first expression comprising a sum of one or more numerator terms divided by a sum of one or more denominator terms;
a second expression comprising a sum of at least two numerator terms divided by a sum of at least two denominator terms.
34. The method of claim 23, wherein the plurality of expressions include:
a first expression comprising a sum of two or more numerator terms divided by a sum of two or more denominator terms;
a second expression comprising a sum of three or more numerator terms divided by a sum of three or more denominator terms.
35. A memory medium comprising program instructions for determining one or more signal parameters for one or more tones in an input signal, wherein the program instructions are executable by one or more processors to implement:
receiving samples of the input signal, wherein the input signal includes the tone;
generating a frequency transform of the samples;
identifying a frequency location proximate to an amplitude peak in the frequency transform, wherein the amplitude peak corresponds to the tone;
selecting two or more frequency bins proximate to the frequency location in the frequency transform;
determining a tone frequency value that minimizes a difference between at least a first expression and a second expression,
wherein the first expression comprises a sum of two or more numerator terms divided by a sum of two or more denominator terms, wherein the first expression includes a tone frequency variable;
wherein each numerator term and each denominator term corresponds to one of the frequency bins;
wherein the second expression comprises a sum of one or more of the numerator terms divided by a sum of one or more of the denominator terms, wherein the second expression includes a tone frequency variable which represents a correct tone frequency value of the tone;
wherein the tone frequency value comprises a frequency of the tone.
36. The memory medium of claim 35,
wherein the tone frequency variable represents a correct tone frequency value of the tone;
wherein the determined tone frequency value represents an approximation of the correct tone frequency value.
37. The memory medium of claim 35,
wherein a ratio of each numerator term and its corresponding denominator term represent a complex amplitude of the tone at a respective bin.
38. The memory medium of claim 35, wherein the first expression and the second expression have the form:

$$\left| \frac{\sum_{k+1}^{k+M} (F(n)W^*(f_n - f_i) - F^*(n)W(f_n + f_i))}{\sum_{k+1}^{k+M} (|W(f_n - f_i)|^2 - |W(f_n + f_i)|^2)} \right| =$$

$$\left| \frac{\sum_{k+1}^{k+M-1} (F(n)W^*(f_n - f_i) - F^*(n)W(f_n + f_i))}{\sum_{k+1}^{k+M-1} (|W(f_n - f_i)|^2 - |W(f_n + f_i)|^2)} \right|$$

wherein:
F(n) is the nth value of the single sided scaled FFT spectrum; and
W represents a window function, wherein the window function is shifted by a value of the tone frequency variable $f_i$.
39. The memory medium of claim 35,
wherein said generating a frequency transform of the samples comprises generating a power spectrum of the samples;
wherein the first expression and the second expression have the form:

$$\left| \frac{\sum_{k+1}^{k+M} (|F(n)| \times |W(f_n - f_i)|)}{\sum_{k+1}^{k+M} |W(f_n - f_i)|^2} \right| = \left| \frac{\sum_{k+1}^{k+M-1} (|F(n)| \times |W(f_n - f_i)|)}{\sum_{k+1}^{k+M-1} |W(f_n - f_i)|^2} \right|$$

wherein:
F(n) is the nth value of the single sided scaled FFT spectrum; and
W represents a window function, wherein the window function is shifted by a value of the tone frequency variable $f_i$.
40. A memory medium comprising program instructions for determining one or more signal parameters for one or more tones in an input signal, wherein the program instructions are executable by one or more processors to implement:
receiving samples of the input signal, wherein the input signal includes the tone;
operating on the samples to generate a frequency transform array;
identifying two or more frequency bins proximate to a first magnitude peak in the frequency transform array;
determining a tone frequency value that minimizes a difference between a first expression and a second expression;
selecting a tone frequency value that makes a plurality of expressions most nearly equal;
wherein each of the plurality of expressions comprises a sum of one or more numerator terms divided by a sum of one or more denominator terms, wherein each of the plurality of expressions includes a tone frequency variable;
wherein each numerator term and each denominator term corresponds to one of the frequency bins;
wherein a ratio of each numerator term and its corresponding denominator term represent a complex amplitude of the tone.

41. A tone detection system, comprising:

an input for receiving samples of an input signal, wherein the input signal includes a tone;

a processor; an a memory medium coupled to the processor, wherein the memory medium stores a tone detection software program for detecting the tone present in the input signal;

wherein the processor is operable to execute the tone detection software program to implement:

generating a frequency transform of the input signal;

identifying an amplitude peak in the frequency transform, wherein the amplitude peak corresponds to the tone;

selecting two or more frequency bins in a neighborhood of the amplitude peak in the frequency transform; and determining a tone frequency value that minimizes a difference between at least a first expression and a second expression;

wherein the first expression comprises a sum of two or more numerator terms divided by a sum of two or more denominator terms, wherein the first expression includes a tone frequency variable;

wherein each numerator term and its corresponding denominator term corresponds to one of the frequency bins; and wherein the second expression comprises a sum of one or more of the numerator terms divided by a sum of one or more of the denominator terms, wherein the second expression includes the tone frequency variable;

wherein the first expression is approximately equivalent to the second expression when the correct tone frequency value is used for the tone frequency variable in the first and second expressions;

wherein the tone frequency value comprises a frequency of the tone.

42. The tone detection system of claim 41, wherein the tone frequency variable represents a correct tone frequency value of the tone; and wherein the determined tone frequency value represents an approximation of the correct tone frequency value.

43. The tone detection system of claim 41, wherein a ratio of each numerator term and its corresponding denominator term represent an amplitude of the tone at a respective bin.

44. The tone detection system of claim 41, wherein a ratio of each numerator term and its corresponding denominator term represent a complex amplitude of the tone at a respective bin.

* * * * *